(12) United States Patent
Suenaga et al.

(10) Patent No.: US 12,268,960 B2
(45) Date of Patent: Apr. 8, 2025

(54) GAME SYSTEM, GAME METHOD, GAME PROGRAM, AND GAME SERVER

(71) Applicants: Tencent Technology (Shenzhen) Company Limited, Shenzhen (CN); THE POKÉMON COMPANY, Tokyo (JP)

(72) Inventors: Yasunori Suenaga, Tokyo (JP); Masaaki Hoshino, Tokyo (JP); Norihiro Sera, Tokyo (JP); Zefeng Ji, Shenzhen (CN); Siqin Yang, Shenzhen (CN); Wenyi Li, Shenzhen (CN)

(73) Assignees: TENCENT TECHNOLOGY (SHENZHEN) COMPANY LIMITED, Shenzhen (CN); THE POKÉMON COMPANY, Tokyo (JP)

( * ) Notice: Subject to any disclaimer, the term of this patent is extended or adjusted under 35 U.S.C. 154(b) by 216 days.

(21) Appl. No.: 17/889,281

(22) Filed: Aug. 16, 2022

(65) Prior Publication Data
US 2022/0387891 A1 Dec. 8, 2022

Related U.S. Application Data

(63) Continuation of application No. PCT/JP2021/007858, filed on Mar. 2, 2021.

(30) Foreign Application Priority Data

Jun. 23, 2020 (JP) .................. 2020-108119

(51) Int. Cl.
*A63F 13/25* (2014.01)
*A63F 13/46* (2014.01)
*A63F 13/53* (2014.01)

(52) U.S. Cl.
CPC .............. *A63F 13/53* (2014.09); *A63F 13/46* (2014.09)

(58) Field of Classification Search
CPC .......... A63F 13/25; A63F 13/40; A63F 13/44; A63F 13/45; A63F 13/46; A63F 13/50;
(Continued)

(56) References Cited

U.S. PATENT DOCUMENTS 11,511,184 B2* 11/2022 Shao .................. A63F 13/56
2015/0174485 A1* 6/2015 Suenaga ............. A63F 13/45
463/40

(Continued)

FOREIGN PATENT DOCUMENTS

JP 2014073353 A 4/2014
JP 2016129538 A 7/2016
(Continued)

OTHER PUBLICATIONS

GameWith, "Evaluation and App Info of Me and Dino", Oct. 8, 2019, 8 pgs., Retrieved from the Internet: https://gamewith.jp/gamedb/show/4487?from=ios.

(Continued)

*Primary Examiner* — Omkar A Deodhar
(74) *Attorney, Agent, or Firm* — Morgan, Lewis & Bockius LLP

(57) ABSTRACT

Provided is a game system where a player of a game can contribute to a team by an action. The game system includes a character action control unit that controls actions of a player character in the play field based on instructions of the player, a point giving control unit configured to add a number of points associated with a neutral character to a point value associated with the player character in response to the neutral character reaching a predetermined state relative to the player character, a scoring unit configured to
(Continued)

convert the point value associated with the player character to a score of its team when the player character is located in a predetermined area provided in the play field and completes a score transferring operation, and an outcome determination unit configured to determine an outcome of the game by comparing scores associated with different teams.

20 Claims, 20 Drawing Sheets

(58) Field of Classification Search
CPC ........ A63F 13/53; A63F 13/537; A63F 13/55; A63F 13/70; A63F 13/79
See application file for complete search history.

(56) References Cited

U.S. PATENT DOCUMENTS

2019/0076739 A1* 3/2019 Ge ..................... A63F 13/537
2019/0255437 A1* 8/2019 Wang ................. A63F 13/5378
2021/0354039 A1* 11/2021 Wan ..................... A63F 13/822

FOREIGN PATENT DOCUMENTS

| JP | 2019051422 A | 4/2019 |
| JP | 2019088421 A | 6/2019 |

OTHER PUBLICATIONS

Shigehiro Okano, "'League of Legends' to Avoid Confusion with Basic Rules and Terminology", Automation Veracity in Gaming, Feb. 13, 2015, 12 pgs., Retrieved from the Internet: https://automaton-media.com/articles/slr/super-lol-rocket-two-step/.
Tencent Technology, ISR, PCT/JP2021/007858, Apr. 6, 2021, 7 pgs.
Tencent Technology, WO, PCT/JP2021/007858, Apr. 6, 2021, 3 pgs.
Tencent Technology, IPRP, PCT/JP2021/007858, Dec. 13, 2022, 4 pgs.
Tencent Technology, Korean Office Action, KR Patent Application No. 10-2022-7043196, Nov. 1, 2024, 7 pgs.

* cited by examiner

GAME SYSTEM, GAME METHOD, GAME PROGRAM, AND GAME SERVER

CROSS-REFERENCE TO RELATED APPLICATIONS

This application is a continuation application of PCT Patent Application No. PCT/JP2021/007858, entitled "GAME SYSTEM, GAME METHOD, GAME PROGRAM, AND GAME SERVER" filed on Mar. 2, 2021, which claims priority to Japanese Patent Application No. 2020-108119, filed with the Japanese Patent Office on Jun. 23, 2020, and entitled "GAME SYSTEM, GAME METHOD, GAME PROGRAM, AND GAME SERVER", all of which are incorporated herein by reference in their entirety.

TECHNICAL FIELD

The present disclosure relates to a game system, a game method, a game program, and a game server. In particular, the present disclosure relates to a game system, a game method, a game program, and a game server in which a plurality of players can play simultaneously via a communication network.

BACKGROUND

In recent years, a type of game in which a plurality of players is divided into a plurality of teams (typically two teams), the teams compete against each other, and victory condition is to destroy a base of an enemy team while cooperating with other players of a team to which a player belongs (ally team), has been actively played. This type of game is called multiplayer online battle arena (MOBA). MOBA has high playability since it allows team-level person-v-person battles.

However, in such a game, in order for a team to win a battle, each member of the team has to possess certain level of skill in operating characters to battle with enemy players, which takes quite some training to grasp. When a team member is not familiar with operation, he becomes a burden of the team. Therefore, newbie players may hesitate to participate in the game, worrying about causing troubles to his teammates.

SUMMARY

Therefore, an object of the present disclosure is to provide a game system, a game method, a game program, and a game server, in which a player can contribute to a team by an action other than an interpersonal battle, and can improve a skill level of operations required for interpersonal battle comfortably.

In order to achieve the above object, the present disclosure provides a game system in which an ally team to which a player belongs and an enemy team to which another player belongs compete in a play field, and an outcome of a game is determined by comparing scores earned by the teams. The game system includes: a character action control unit configured to control actions of a player character of the player in the play field based on instructions of the player; a character state determination unit configured to associate a neutral character with the player when fight result between the neutral character and the player character indicates victory of the player character, the neutral character being configured to act without being operated by the player or the another player and being able to fight against the player character; and an ally character control unit that performs control such that after the neutral character is stored as an ally character in a virtual character storage area in response to the association of the neutral character with the player, appearance of the ally character from the character storage area to the play field and storage of the ally character to the character storage area can be repeated.

According to the game system, game method, game program, and game server of the present disclosure, it is possible to provide a game system, a game method, a game program, and a game server in which in a game that can be participated by a plurality of players, a player can contribute to a team by an action other than an interpersonal battle in the game, and can improve a skill level of operations required for the interpersonal battle with this action.

DETAILED DESCRIPTION OF THE EMBODIMENTS

Figure 1:
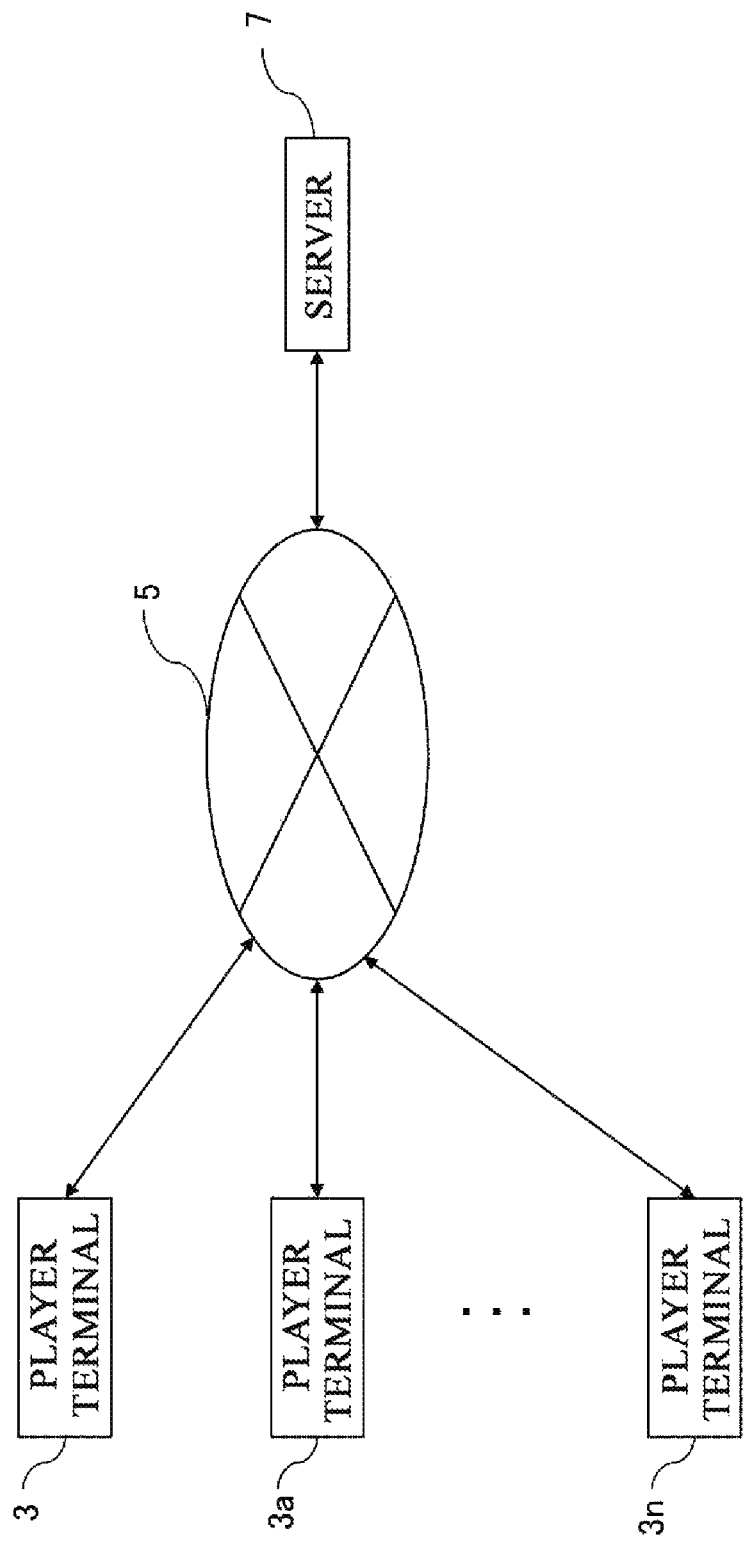
FIG. 1 is a schematic diagram of a game system according to the present embodiment.
Figure 2:
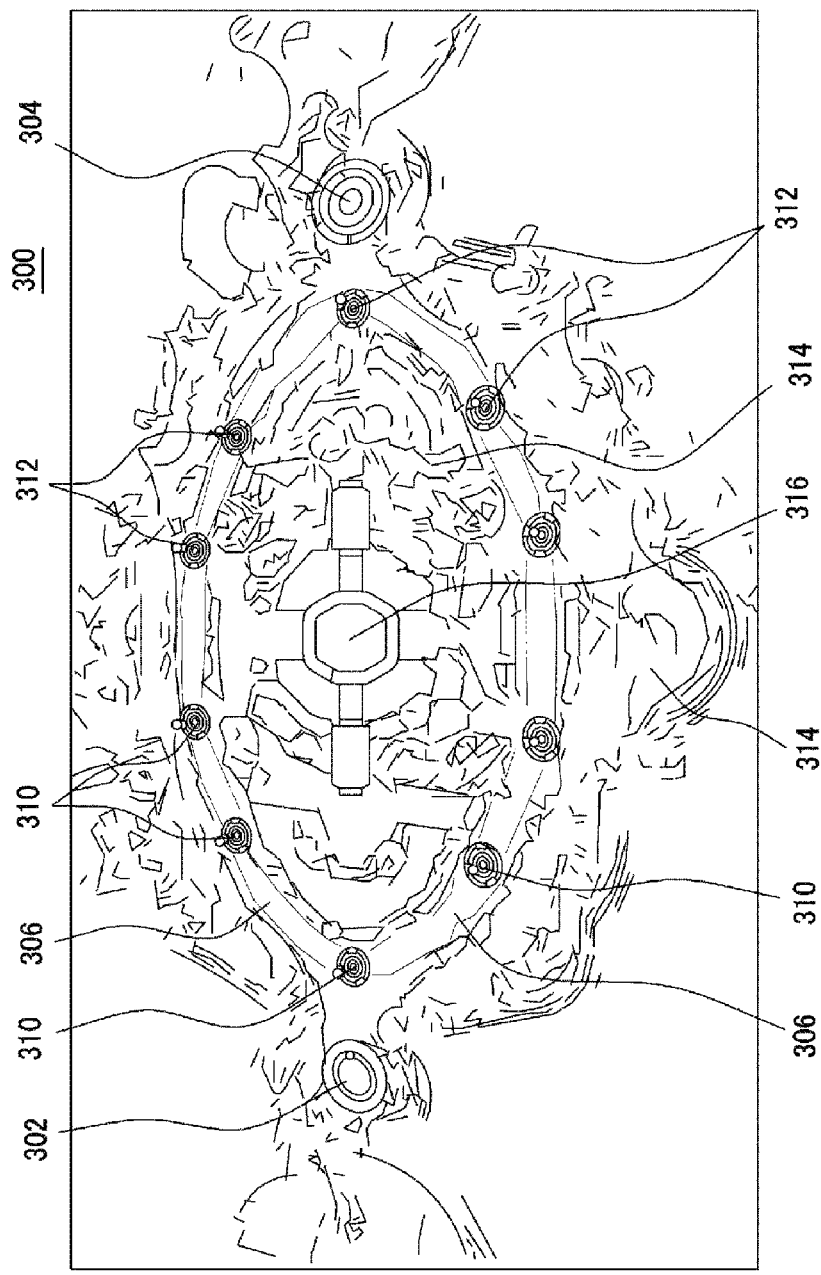
FIG. 2 is a schematic diagram of a play field of a game executed by the game system according to the present embodiment.

FIG. 1 shows an outline of a game system according to the present embodiment. FIG. 2 shows an outline example of a play field of a game executed by the game system according to the present embodiment.

A game system 1 according to the present embodiment is a game system that can be executed by an information terminal 3 such as a smartphone, in which each of a plurality of players can play a game at the same time by connecting the information terminal 3 of each player to a server 7 via a communication network 5. The game system 1 divides the players at least into one team including player characters of one or more players (hereinafter, may be referred to as "ally team") and the other team including other player characters of one or more other players (hereinafter, may be referred to as "enemy team") to compete against each other, and determines a winning team of the game by comparing the score earned by the ally team with the score earned by the enemy team. The game system 1 may be one type of a multiplayer online battle arena (MOBA). Here, the server 7 and the information terminals owned by the players (for example, the information terminal 3, an information terminal 3a, . . . , and an information terminal 3n) are connected to each other via, for example, the communication network 5 so that bidirectional communication is possible. The game system 1 may be a server-client type game system.

A character operated by a player per se is referred to as a player character, a team to which the player belongs is referred to as an ally team, a character operated by a player belonging to the ally team other than the player is referred to as an ally player character, a team to which another player that the player fight against belongs is referred to as an enemy team, and a character operated by another player belonging to the enemy team is referred to as an enemy player character.

That is, the game system 1 is executed while dividing the players into the ally team to which the player character operated by the player belongs and the enemy team to which the enemy player character operated by another player belongs. The game system 1 scores points earned by each player character (that is, the player character, the ally player character, and the enemy player character) during the game when a predetermined condition is satisfied, so as to obtain a score of the team to which each player character belongs, and the game system 1 determines an outcome of the game by comparing the scores earned by the teams at an end of a game time.

For example, the game system 1 is executed in a play field 300, which is a virtual space. As an example, as shown in FIG. 2, the play field 300 includes an ally headquarter 302 of the ally team to which the player character belongs, an enemy headquarter 304 of the enemy team to which the enemy player character belongs, one or more lanes 306 connecting the ally headquarter 302 and the enemy headquarter 304, one or more ally bases 310 provided along at least one or more of the lanes within a predetermined distance from the ally headquarter 302, one or more enemy bases 312 provided along at least one or more of the lanes 306 within a predetermined distance from the enemy headquarter 304, neutral regions 314 provided between the plurality of lanes 306 and at least a part of lateral sides of the plurality of lanes 306, and a central part 316 provided equidistant from the ally headquarter 302 and the enemy headquarter 304. As a rule, the player character can freely move to a desired position in accordance with an instruction of the player except for immovable regions in the play field 300 (for example, a wall, a rock, a pond, and the like provided in the play field 300).

The game system 1 causes a neutral character, i.e., a non-player character NPC, to appear at a predetermined position in the lanes 306 and/or the neutral regions 314. The neutral character is a character that acts without being operated by any player. The neutral character is a character automatically controlled by the game system 1 and a character that can be attacked and defeated by the player character, the ally player character, and/or the enemy player character so as to be acquired by the player succeeding in defeating the neutral character. Further, the neutral character is associated with a predetermined number of points according to a type and/or status (for example, a level, and the like) of the neutral character.

When the player character attacks and defeats the neutral character within a predetermined range from the player character according to an instruction of the player, the game system 1 cause the player who operates the player character to acquire the neutral character. Then, the game system 1 changes the neutral character into the ally character of the player character, and gives the player character the points possessed by the neutral character. As a result, the player character earns the points. The game system 1 stores this ally character in a virtual character storage area of the player.

The game system 1 can cause the ally character to appear in the play field 300 from the character storage area and store the ally character from the play field 300 into the character storage area according to an instruction of the player. When the player causes the ally character to appear in the play field 300, the game system 1 causes the ally character to automatically follow the player character, and to automatically attack the neutral character and/or the enemy player character within a predetermined range from the player character or the ally character. Generally speaking, the ally character can fight together with the player character.

The game system 1 can also cause the player character to attack the enemy player character within a predetermined range from the player character according to an instruction of the player. When the player character attacks and defeats the enemy player character, the game system 1 gives a predetermined number of points to the player character. For example, the game system 1 remove at least a portion points from the enemy player character and gives it to the player character. In sum, in the game system 1, the player can not only perform an interpersonal battle against the enemy player character by operating the player character but can also perform a battle between the player character and the neutral character (a battle against the system) according to an intention of the player. As a result, the player character operated by the player can earn points by defeating the enemy player character or by defeating the neutral character.

When the player character is within a predetermined area of the play field 300 (for example, within a predetermined range from the enemy base 312), the game system 1 can supply the points earned by the player character to the enemy base 312 according to an instruction of the player, so as to convert these points into the score of the ally team. In other words, no score will be given to the ally team until the points are scored (hereinafter, converting points into a score may be referred to as "scoring"). In this case, the game system 1 resets the points earned by the player character before scoring to zero while scoring the points, and erases the ally character stored in the character storage area of the player, or the ally character that exits the character storage area and appears in the play field 300. Here, erasing the ally character means restricting the ally character from appearing in the play field 300 again in the same gameplay. As a result, the ally character can no longer battle together with the player character. A predetermined durability value is set for the enemy base 312, and the game system 1 stops function of the enemy base 312 when a total value of points supplied to the enemy base 312 (hereinafter referred to as "supply value") equals to or exceeds the durability value. For example, the game system 1 can display a scene that the enemy base 312 is destroyed and indicate that the function of the enemy base 312 is stopped. In other words, the game system 1 deactivates the enemy base 312. In some embodiments, the scoring unit deducts the point value associated with the player character from a durability value associated with the predetermined area (e.g., the enemy base 312) and changes a state of the predetermined area from active to inactive in response to the durability value reaching a threshold. In some embodiments, there are two or more predetermined areas corresponding to the enemy team provided at intervals in the play field, such as enemy bases. An impediment generation unit is configured to impede the player character from moving between two of the predetermined areas being active, e.g., by slowing the player character's movement between the at least two of the predetermined areas.

Thus, in the game system 1, the player character operated by the player can acquire points by attacking and defeating the neutral character and/or the enemy player character, and can use the acquired points as the score of the ally team by supplying the points to the enemy base. Here, in the game system 1, the acquired neutral character can be caused to act together with the player character as an ally character (in this case, the ally character can be controlled to automatically fight together with the player character, move to follow the player character, and attack on the neutral character and the enemy player character within predetermined surroundings of the ally character), and when the points earned by the player character are scored, the ally character owned by the player is erased at the time of scoring and cannot be caused to appear in the game. As a result, in the game system 1, when the neutral character is acquired and turned into the ally character, the player can choose whether to score the points obtained by earning the neutral character and erase the ally character, or to hold and fight together with the ally character without scoring the earned points, so that a strategic characteristic of the game can be improved.

In the game system 1, the player character can earn points by battling only against the neutral character and avoid any battling against the enemy player character, that is, not battling interpersonally at all, and the earned points can also be scored at the enemy base. Therefore, even a player who hesitates to join an interpersonal battle or a player who feels being not good at the interpersonal battle can contribute to a team to which he/she belongs. That is, in the game system 1, the game can be enjoyed even without performing an interpersonal battle. In the game system 1, the player can improve a skill level of battle in the game through the battle against the neutral character. As a result, according to the game system 1, the player can become accustomed to the battle, and the feeling of being not good at the interpersonal battle is gradually reduced.

Further, in the game system 1, when the player character defeats a neutral character or an enemy player character, the player character acquires an experience value, and when a total value of the acquired experience value equals to or exceeds a predetermined value, appearance and ability of the player character can be changed (hereafter, this change is referred to as "evolution"). Due to this evolution, the player character can improve ability thereof and learn a "skill" to attack the neutral character and the enemy player character. As a result, in MOBA in the related art, in order to improve attack power and the like of the player character, the player character needs to acquire and equip a predetermined item in the game, but in the game system 1, since the player character evolves to automatically learn the "skill", the player character can be strengthened with no need of complicated operations. Moreover, in the game system 1, since the appearance of the player character can be changed by the "evolution", the player can understand at a glance how strong the player character is.

The information terminals 3, 3a, . . . , 3n are information terminals such as mobile phones, smartphones, notebook computers, tablet PCs, PCs, portable game machines, and/or home game machines. When there are a plurality of information terminals, types of the information terminals may be different. Details of the game system 1 according to the present embodiment will be described below, but names and numerical values in the above description and the following description are merely examples. The present disclosure is not limited to these proper names and numerical values, and these proper names and numerical values are not always related to real proper names and numerical values.

Figure 3:
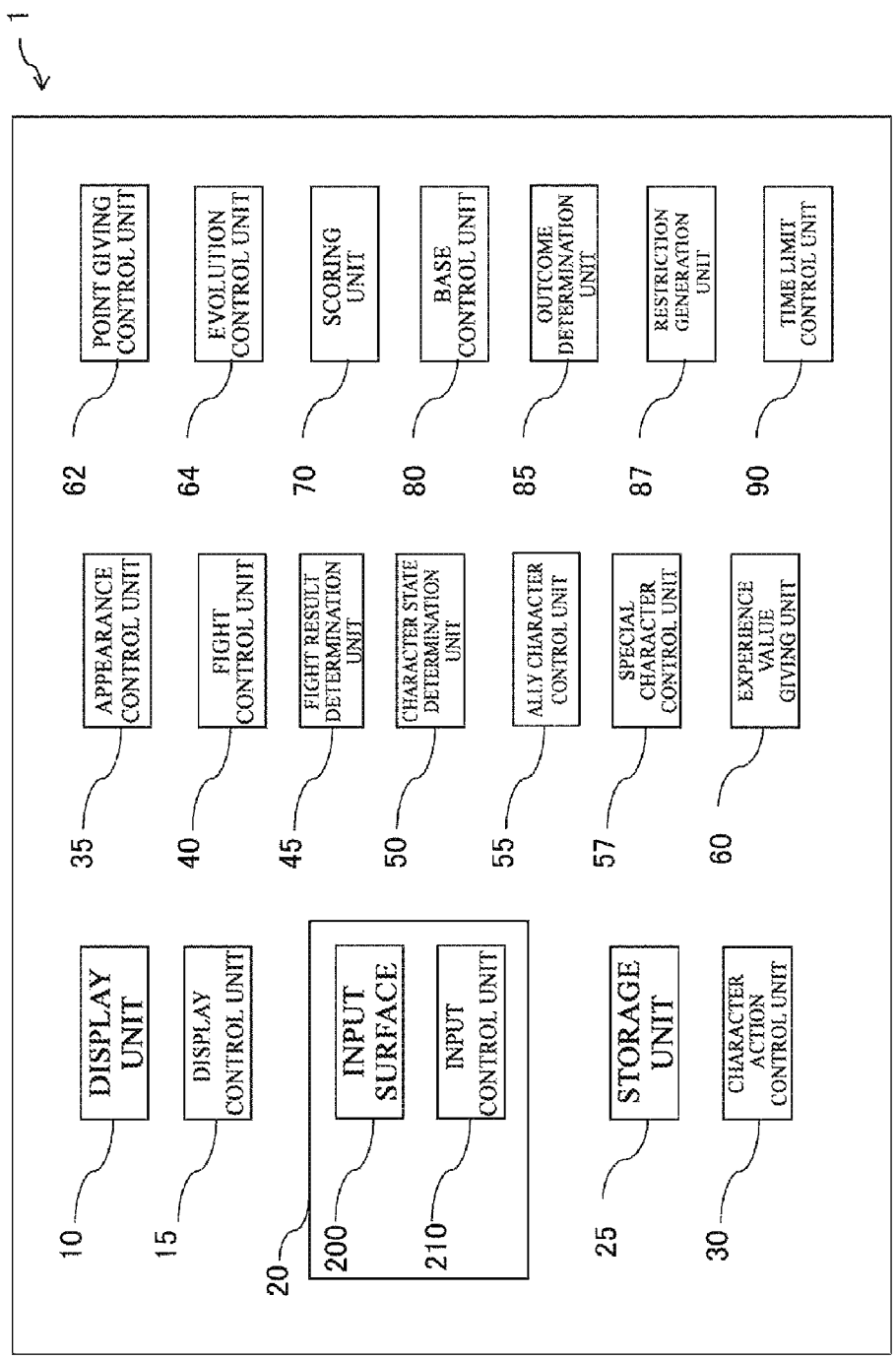
FIG. 3 is a functional configuration block diagram of the game system according to the present embodiment.
Figure 4:
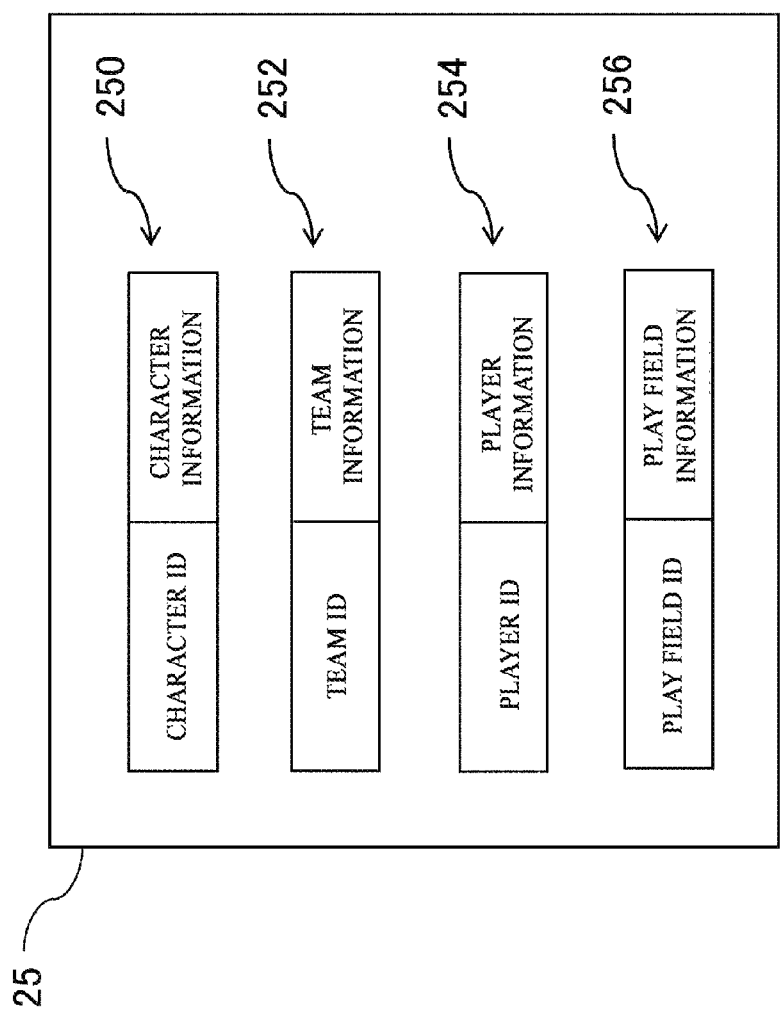
FIG. 4 is a data configuration diagram of each storage section included in a storage unit according to the present embodiment.

FIG. 3 shows an example of a functional configuration of the game system according to the present embodiment. FIG. 4 shows an example of a data configuration of each storage section of a storage unit of the game system according to the present embodiment.

The game system 1 according to the present embodiment is a game system in which the ally team to which the player and the ally player belong and the enemy team to which the enemy player belongs compete in the play field 300, and determines the outcome of the game by comparing the scores obtained by the teams. The game system 1 includes: a display unit 10 that displays the play field 300, the player character, and the like; a display control unit 15 that controls display of the display unit 10; an input unit 20 that receives instructions from a player; a storage unit 25 that stores various types of information used in the game; a character action control unit 30 that controls actions of the player character; an appearance control unit 35 that controls appearance of the neutral character and/or a special character; fight control unit 40 that controls fight between the player character and various other characters; fight result determination unit 45 that determines fight results between the player character and the various other characters; a character state determination unit 50 that determines states of a character; an ally character control unit 55 that controls actions and the like of the ally character; a special character control unit 57 that controls actions and the like of the special character; an experience value giving unit 60 that gives an experience value to the player character; a point giving control unit 62 that adds points to the player character or the player; an evolution control unit 64 that controls evolution of the player character; a scoring unit 70 that converts points into a score; a base control unit 80 that controls the ally base and the enemy base; an outcome determination unit 85 that determines the outcome of the game by comparing scores associated with different teams of the game; a restriction generation unit 87 that generates a predetermined restriction between bases; and a time limit control unit 90 that controls a time limit of the game. In some embodiments, the game system 1 includes a point removing unit configured to remove at least a portion of the point value from the player character in response to the player character being killed. The special character is a character among the neutral characters (NPC) that can fight against the player character, and belongs to the team to which the player character belongs but will not be stored in the character storage area when the special character loses in the fight against the player character. In some embodiments, the game system 1 further includes a conversion unit configured to convert the special character to a state facilitating the ally team to obtain scores after the neutral character is defeated by the player character. For example, the special character may fight with characters belonging to the enemy team and provide buff to characters belonging to the ally team, or add points to the score of the ally team by, e.g., moving the special character toward the predetermined area and adding the portion of points to the score associated with the ally team in response to the special character reaching the predetermined area. In some embodiments, the special character expedites the score conversion operation for player characters belonging to the ally team.

The storage unit 25 includes: a character information storage section 250 that stores information related to the player character, the neutral character, and/or the special character; a team information storage section 252 that stores information related to the teams participating in the game; a player information storage section 254 that stores information related to the players; and a play field information storage unit 256 that stores information related to the play field 300.

The game system 1 may not only have a plurality of components physically located in the same device or location, but may also have some of the plurality of components installed at physically separated positions. In this case, each component may be connected by a communication network such as the Internet. For example, in the game system 1, a part of functions of the components may be carried by an external server. The game system 1 may be configured as one or more servers. In this case, the game system 1 is configured by combining the information terminals, components of one server, and components of other servers. In the present embodiment, an assembly of predetermined components can be understood as one "information processing device", and the game system 1 may be formed as an assembly of a plurality of information processing devices. A method for allocating a plurality of functions required to implement the game system 1 according to the present embodiment to one or a plurality of hardware can be appropriately determined in consideration of processing capacity of each hardware and/or specifications required for the game system 1. Various types of information stored in the storage unit 25 may be updated according to an instruction of a user and information received via the input unit 20, or may be updated at any time by acquiring predetermined information from a predetermined server existing outside the game system 1.

In the following description, a case where the player mainly executes the game provided by the game system 1 by using the information terminal 3 (for example, smartphone, tablet, PC, or the like) will be described as an example. The information terminal 3 includes at least the display unit 10 and the input unit 20.

The display unit 10 is controlled by the display control unit 15 and displays information about the game including the play field 300 in which the game is executed, the player character (the ally character, and the enemy character), the neutral character, the special character, and/or other items. The display unit 10 outputs various processing results and information stored in the storage unit 25 in a manner that can be perceived by the player. Specifically, the display control unit 15 causes the display unit 10 to display various processing results of each component, information stored in the storage unit 25, and the like as data in predetermined formats, still images, videos, and/or texts. The display unit 10 may also display information received from the external servers.

The input unit 20 receives an input such as a predetermined instruction or operation from the player. The input unit 20 supplies the instruction to a predetermined component of the game system 1. Each component that receives the instruction performs a predetermined function. For example, the input unit 20 is a touch panel, a tablet, a mouse, a motion sensor, or the like. In the present embodiment, an example in which the input unit 20 is a touch panel included in the information terminal 3 will be described. The touch panel may be capable of multi-touch detection. Specifically, the touch panel as the input unit 20 includes an input surface 200 for inputting operation and the like from the player and an input control unit 210 that acquires information related to the operation input by the input surface 200. The touch panel is configured to overlap the display unit 10, and a surface of the touch panel corresponds to the input surface 200.

For example, the display unit 10 is provided with an area for receiving a predetermined instruction, and the input surface 200 detects the predetermined instruction at a position designated by the operation (for example, touch operation, tap operation, slide operation, and the like.) of the player with respect to the area of the input surface 200. The input surface 200 supplies the detected information, that is, information indicating the predetermined instruction at the detected position, to the input control unit 210. The input control unit 210 acquires the information indicating the predetermined instruction from the input surface 200, and supplies the information to a predetermined component of the game system 1.

The storage unit 25 stores various types of information related to the game system 1. Each storage section included in the storage unit 25 supplies the predetermined information to a predetermined component in response to a request from the other components of the game system 1. In the game system 1, when one game ends, the next game may be executed without taking over a situation of the one game. Therefore, in the game system 1, the next game is started in a state where information related to the experience value, level, status, possessed points, possessed ally character, and/or evolution situation of all of the player character, the ally player character, and the enemy player character is returned to an initial state. That is, the game system 1 may return at least a part of the information stored in the storage unit 25 to initial values each time a new game is started.

The character information storage section 250 stores various types of information (character information) related to the character in association with a character ID that identifies the character. Here, the character includes the player character, the neutral character, and the special character. Examples of the character information include a character name, a character status (for example, experience value, level, hit point (HP), and the like), points associated with the character (points possessed by a character), attack methods normally available to the character, skills that can be used by the character when predetermined conditions are satisfied, evolution situation of the character, a character ID of an evolution target character when the character evolves, and the like. In the game system 1, the player can select any player character to be used in the game from a plurality of characters at a start of the game. Here, when the character is a player character, the character status, the points possessed by the character, the evolution situation of the character, and the like are reset every time a new game is started. When the character is a player character, the points possessed by the character is synonymous with the points associated with the player.

The "skills" may include a skill for taking over points possessed by the enemy player character (points associated with the enemy player), the ally character of the enemy player character that is in the character storage area of the enemy player character, and/or the ally character of the enemy player character appearing in the play field 300.

The team information storage section 252 stores various types of information (team information) related to a team in association with a team ID that identifies the team. Examples of the team information include information related to players constituting a team (for example, a player ID described later), a character ID of a character associated with the team in the game (for example, a special character), the score earned by the team in the game, and the like.

Here, the team is constituted by one or more players. In the game system 1, at the start of the game, the one or more players constituting the team can be randomly determined, or one player can invite another player to constitute the team. Therefore, the information related to the player as the team information stored by the team information storage section 252 in association with the team ID may be reset every time a new game is executed. The team information stored in the team information storage section 252 may be reset each time the game ends.

The team information storage section 252 can temporarily store the character ID. For example, when a player character belonging to the team defeats a special character during execution of the game, the team information storage section 252 may store a character ID of the special character for a certain period of time and delete the character ID after the certain period of time. Further, the team information storage section 252 may store character IDs of special characters stored during the execution of the game in a chronological order. The team information storage section 252 may delete all the character IDs stored during the execution of the game at the end of the game.

The player information storage section 254 stores information related to a player who plays the game. Specifically, the player information storage section 254 stores player information in association with the player ID that identifies the player. Examples of the player information include information related to a player name, the neutral character acquired by the player winning battles in the game, rewards earned by the player in the game (including the points, score, experience value, and the like earned by executing the game), and the like. The player information storage section 254 can update the information related to the neutral character as the player information or store the information in a chronological order each time a player wins against a neutral character in a battle of the game and acquires the neutral character. In the player information stored in the player information storage section 254, information related to the neutral character acquired by the player, the rewards earned by the player in the game, and the like is reset every time the game ends. Alternatively, the information related to the neutral character acquired by the player, the rewards earned by the player in the game, and the like as the player information stored by the player information storage section 254 in association with the player ID may be reset each time the game is executed. What is reset here is information for continuing a series of play from start of the play until an outcome of a team is determined, and gameplay history information (numbers of victory and defeat in battle, number of earned experience value), which is a result of a series of gameplay, is not reset and is stored in the player information storage section 254. For example, by repeating a series of gameplay and winning a predetermined number of times, types of player characters and types of player character skills that can be used by the player are increased.

The play field information storage section 256 stores information related to the play field 300. Specifically, the play field information storage section 256 stores play field information in association with a play field ID that identifies the play field. The play field information is, for example, information related to a play field name, arrangement and number of various elements constituting the play field, and the like. The game system 1 can also use a predetermined play field in a fixed manner, in which case the storage unit 25 may not include the play field information storage section 256.

The character action control unit 30 controls actions of the player character of the player in the play field 300 based on instructions of the player. Specifically, the character action control unit 30 controls actions such as moving, stopping, attacking, defending, and points scoring of the player character in the play field 300 based on instructions of the player received by the input unit 20. The display unit 10 is controlled by the display control unit 15 and displays the actions of the player character controlled by the character action control unit 30.

The appearance control unit 35 controls appearance of the neutral character and/or the special character in the play field 300. The appearance control unit 35 causes the neutral character and/or the special character to appear at a predetermined location in the play field 300 at a predetermined time interval or a random time interval. The appearance control unit 35 preferably causes the neutral character and/or the special character to appear at a predetermined time interval from a viewpoint of equalizing chances of encountering the neutral character and/or the special character of the players belonging to each team.

Here, a plurality of appearance locations of the neutral character can be provided, for example, at positions that are line-symmetrical with a predetermined virtual straight line passing through the center of the play field 300 as a symmetry axis, from a viewpoint of equalizing chances of contact with the neutral character between a player character belonging to a first team (for example, the ally team to which the player belongs) and a player character belonging to a second team (for example, the enemy team). For example, in the substantially elliptical play field 300 shown in FIG. 2, the appearance control unit 35 sets a short axis passing through the center of the play field 300 as a symmetry axis, causes a neutral character to appear at a predetermined position in the lane 306, and causes a neutral character of the same type to appear at a line-symmetrical position with respect to that position. A plurality of appearance locations of the neutral character may be provided at point-symmetrical positions with the center of the play field 300 as a symmetry point.

From a viewpoint of equalizing chances of contact with the special character, the appearance control unit 35 also causes the special character to appear in areas where each team can contact the special character equally. For example, the appearance control unit 35 causes special characters to appear at a predetermined time interval at specific positions of the playfield 300, for example, in the vicinity of the intersections of the short axis passing through the center of the play field 300 and the lanes 306 in a case where the central part 316 and/or the playfield 300 is approximately elliptical. When the appearance control unit 35 causes the special characters to appear, the display unit 10 is controlled by the display control unit 15, and can display information (for example, text display and the like) indicating that the special characters appear at predetermined positions of the display unit 10.

When the neutral character, the special character, and/or the enemy player character (hereinafter referred to as "target character") is within a predetermined range from the player character, the fight control unit 40 starts fight (a battle) between the player character and the target character and controls the fight when the input unit 20 receives an attack instruction against the target character from the player. For example, the fight control unit 40 causes the player character to attack the target character in response to the instruction of the player received by the input unit 20, and deals damage to the target character based on the attack. When the player character is attacked by the target character, the fight control unit 40 deals damage to the player character based on the attack.

For example, the fight control unit 40 changes status of the player character based on the damage dealt to the player character from the target character (for example, reduces an HP that indicates damage that the character can withstand), and changes status of the target character based on the damage dealt to the target character from the player character. The display unit 10 is controlled by the display control unit 15 and displays the state of the fight between the player character controlled by the fight control unit 40 and the target character, damage dealt to an opponent character, and the like. Even if no target characters are within the predetermined range from the player character, the fight control unit 40 can also cause the player character to execute an attack action when the fight control unit 40 receives the attack instruction of the player via the input unit 20.

The player character may have one or more attack methods. That is, in addition to a normally usable attack method that can attack the target character at any timing in the game, the player character can also use a predetermined skill based on the experience value earned by the player character. For example, a predetermined experience value is associated with a skill as the character information that the character information storage section 250 stores in association with the character ID, and when the experience value earned by the player character becomes equal to or greater than the predetermined experience value, the fight control unit 40 permits the player character to use the skill. When receiving an instruction to use the skill from the player via the input unit 20, the fight control unit 40 activates the predetermined skill on the player character, and then may prohibit activation of the skill again until a predetermined time elapses. The fight control unit 40 supplies information indicating the change in the status of the player character and the change in the status of the target character caused by the fight to the fight result determination unit 45.

The fight result determination unit 45 determines fight result between the player character and the target character in the fight controlled by the fight control unit 40. Specifically, the fight result determination unit 45 determines which character wins or loses in the fight based on the change in the status of the player character and the change in the status of the target character. For example, each character has hit points (HP) as one status thereof, and the fight result determination unit 45 determines that the character whose HP becomes zero first in the fight is defeated, and the character whose HP remains wins.

When three or more characters are fighting against each other, for example, when fight is executed in which a player character of the ally team (an ally player character) and a player character of the enemy team (an enemy player character) attack a neutral character or a special character, the fight result determination unit 45 may determine that a character who made a last attack to make the HP of the neutral character or the special character zero satisfies an acquiring condition of the neutral character (wins) (that is, it may be determined that the ally player character defeats the neutral character or the special character). Alternatively, the fight result determination unit 45 may determine that a character that has performed a maximum number of attacks (hits) until the HP of the neutral character or the special character is reduced to zero, or a character that has dealt a maximum total damage (that is, a total amount of HP reduction) to the neutral character or the special character wins. The fight result determination unit 45 supplies information indicating fight result to the character state determination unit 50, the experience value giving unit 60, and the point giving control unit 62.

The character state determination unit 50 determines the state of the player character and/or the target character based on a determination result of the fight result determination unit 45. When the determination result of the fight result determination unit 45 (that is, the fight result) indicates victory of the player character, the character state determination unit 50 determines the state of the player character and/or the target character according to the type of the target character. Then, the character state determination unit 50 supplies information indicating the determination result to the ally character control unit 55 and the special character control unit 57.

Specifically, when the target character is a neutral character, the character state determination unit 50 associates the neutral character with the player when a predetermined acquiring condition is satisfied. That is, the character state determination unit 50 associates the neutral character against which the player character wins with the player. The character state determination unit 50 stores the character ID of this neutral character as the player information in the player information storage section 254 in association with the player ID as an ally character. As a result, a state in which the player has acquired this neutral character is determined. Then, the character state determination unit 50 erases display of the neutral character from the play field 300. That is, the character state determination unit 50 causes the display control unit 15 to erase the display of the neutral character on the display unit 10. The character state determination unit 50 changes the neutral character to an ally character and associates the ally character with the player in response to the association of the neutral character with the player. The ally character is stored in the virtual character storage area for the player. The display control unit 15 displays, for example, the virtual character storage area at a predetermined position of the display unit 10. The character storage area may be displayed in a manner superimposed on the play field 300. Therefore, in this case, it is determined that the neutral character has become the ally character of the player, and that the ally character is stored in the character storage area. Alternatively, when the neutral character is acquired, the neutral character may not be stored in the character storage area. In this case, this neutral character acts as an ally character that appears in the play field 300.

Here, a case where the player character fight a new neutral character and wins while the neutral character is already associated with the player as an ally character will be described. In this case, the character state determination unit 50 overwrites the character ID of the ally character stored in the player information storage section 254 in association with the player ID with a character ID of the newly defeated neutral character. That is, in one aspect of the game system 1, there may be only one ally character associated with the player (in other words, one ally character that is a neutral character that can be acquired and possessed by the player), and when the player character defeats a plurality of neutral characters, a neutral character that is the last opponent against which the player character wins, is associated with the player and becomes the ally character. Then, the character state determination unit 50 erases the ally character stored in the character storage area, and newly stores the newly defeated neutral character as an ally character in the character storage area.

An aspect will be described in which the player character and/or the ally character fight a new neutral character and wins while the ally character is out of the character storage area and appears in the play field 300. In this case, the character state determination unit 50 overwrites the character ID (this character ID is the character ID of the ally character appearing in the play field 300) of the ally character stored in the player information storage section 254 in association with the player ID with the character ID of the newly defeated neutral character. Then, the character state determination unit 50 erases the ally character appearing in the play field 300, and stores the newly defeated neutral character as an ally character in the character storage area. Therefore, in this case, it is determined that the newly defeated neutral character becomes the ally character of the player, and that the ally character is stored in the character storage area. After the ally character is stored in the character storage area, it is determined that the original ally character that appears in the play field 300 has been erased. Alternatively, the original ally character may not be erased, and a plurality of ally characters may be stored in the character storage area. In this case, it is preferable to display a plurality of display icons in the character storage area so as to correspond to the plurality of characters.

When the player character wins against the neutral character, the character state determination unit 50 may associate the neutral character with the team to which the player of the player character belongs. For example, the character state determination unit 50 stores the character ID of this neutral character as team information in the team information storage section 252 in association with the team ID as an ally character. As a result, the team to which the player of the player character belongs can acquire this neutral character as an ally character. In this case, the character state determination unit 50 may set an upper limit on the number of ally characters that can be associated with the team. However, the player who can acquire the points possessed by the neutral character by defeating the neutral character is the player of the player character who defeated the neutral character. Further, in this case, the neutral character acquired by the team may be stored in the character storage area of any player belonging to the team, or the neutral character acquired by the team may not be stored in the character storage area (in this case, this neutral character may remain appearing in the play field 300).

Further, when the player character wins against a special character, the character state determination unit 50 associates the special character with the team to which the player of the player character belongs. For example, the character state determination unit 50 stores the character ID of this special character as the team information in the team information storage section 252 in association with the team ID. However, in this case, the character state determination unit 50 does not store the special character in the character storage area, and keeps the special character remaining appearing in the play field 300.

When a plurality of characters (ally player character and/or enemy player character) attack the neutral character and the determination result of the fight result determination unit 45 indicates that the player character who defeated the neutral character is the player character who made the last attack to make the HP of the neutral character zero, the character state determination unit 50 associates the neutral character with the player of this player character. When a plurality of characters attack the special character and the determination result of the fight result determination unit 45 indicates that the player character who defeated the special character is the player character who made the last attack to make the HP of the special character zero, the character state determination unit 50 associates the special character with the team to which this player character belongs.

When the target character is an enemy player character, the character state determination unit 50 causes the enemy player character who lost the fight (for example, the enemy character whose predetermined parameter such as the HP has become zero) to move from the defeated position of the play field 300 to the enemy headquarter 304 after a predetermined time elapses (that is, after a predetermined recovery time elapses). Then, the character action control unit 30 controls actions of the enemy player character moved to the enemy headquarter 304 in response to instructions of the player of the enemy player character. The character state determination unit 50 can give an advantageous effect (for example, HP recovery effect and the like) to the enemy player character existing in the enemy headquarter 304.

When the player character is defeated by any target character, the character state determination unit 50 moves the player character from the defeated position of the play field 300 to the ally headquarter 302 after a predetermined time has elapsed (that is, after the predetermined recovery time has elapsed). In this case, the character action control unit 30 may fully recover the HP and the like of the player character. Then, the character action control unit 30 controls actions of the player character moved to the ally headquarter 302 in response to instructions of the player of the player character. The character state determination unit 50 can give an advantageous effect (for example, the HP recovery effect and the like) to the ally player character existing in the ally headquarter 302.

The ally character control unit 55 controls actions of the ally character based on the information indicating the determination result of the character state determination unit 50. Specifically, the ally character control unit 55 performs control such that a predetermined effect of the ally character can be generated in the play field 300 when the neutral character is associated with the player. That is, when the player possesses an ally character, the ally character control unit 55 performs control such that an effect based on characteristics of the ally character can be generated in the play field 300.

For example, when the determination result of the character state determination unit 50 indicates that the player character satisfies the acquiring condition of a neutral character in the fight between the player character and the neutral character, the player possesses the neutral character as an ally character, and the ally character is stored in the character storage area. Therefore, the ally character control unit 55 performs control such that the appearance of the ally character from the character storage area to the play field 300 and the storage of the ally character in the character storage area can be repeated. In this case, an effect that the appearance in the play field 300 and the storage in the character storage area of the ally character can be repeated is generated. For example, the ally character control unit 55 prohibits the appearance of the ally character from the character storage area to the play field 300 for a predetermined time after the player acquires the neutral character (that is, after the neutral character disappears from the play field 300 and is stored in the character storage area as an ally character), and enables the appearance of the ally character from the character storage area to the play field 300 and the storage from the play field 300 to the character storage area in response to the instruction of the player received via the input unit 20 after the predetermined time elapses.

When the ally character appears in the play field 300 in response to the instruction of the player, the ally character control unit 55 controls the ally character that has appeared to automatically follow the player character around the player character. That is, the ally character control unit 55 causes the ally character to follow the player character that moves in the play field 300 in response to instructions of the player received via the input unit 20. Then, the ally character control unit 55 causes the ally character to automatically execute an attack on the enemy player character, another neutral character, and/or the special character that exist within a predetermined range from the ally character appearing in the play field 300. The ally character control unit 55 prohibits the ally character from attacking the ally player character and/or the ally character of the ally player character.

The ally character control unit 55 causes the ally character to automatically attack the enemy player character, the other neutral character, and/or the special character, and deals damage based on the attack to "the enemy player character, the other neutral character, and/or the special character (attack target character)". Among attack target characters located within a predetermined range around the ally character, the attack target character closest to the ally character may be attacked, or the attack target character attacked by the player character may be attacked. When the ally character is attacked by the attack target character, the ally character control unit 55 deals damage based on the attack to the ally character. Then, the ally character control unit 55 determines the fight result between the ally character and the attack target character. That is, the ally character control unit 55 determines which character wins or loses in the fight based on change in the status of the ally character and change in the status of the attack target character. For example, the ally character control unit 55 determines that the character whose HP has become zero loses. The ally character control unit 55 supplies the determination result to the point giving control unit 62.

When the player acquires the neutral character as the ally character, the ally character control unit 55 can also generate a predetermined effect associated with the ally character in advance (for example, an effect of a skill set for the ally character) in a predetermined area of the play field 300. For example, when a player character of the team to which the player belongs exists in a predetermined area of the play field 300, the ally character control unit 55 can generate an effect that is advantageous to the player character (for example, an HP recovery effect or the like). When a player character of a team that is hostile to the team to which the player belongs exists in the predetermined area, the ally character control unit 55 can also generate an effect that is disadvantageous to the player character (for example, reduction of attack power or the like).

The special character control unit 57 refers to the information indicating the determination result received from the character state determination unit 50, and generates a predetermined effect on one or more player characters of the ally team existing within a predetermined range centering on the special character when the acquired information indicates that the fight result between the player character and the special character indicates the victory of the player character and that the special character is associated with the team to which the player character belongs (that is, the ally team). The predetermined effect may be an effect such that the team to which the player character who has won against the special character belongs is advantageous in progress of the game. When the special character is associated with the ally team, the special character control unit 57 may automatically cause the special character to advance toward the enemy bases of the enemy team provided in the play field 300.

Here, a character having various characteristics is exemplified as the special character. Examples for the special character include a special character that takes over the points possessed by the player character when losing to the player character (hereinafter, it may be referred to as a "first special character"), and a special character that possesses points equal to or larger than a predetermined value in advance, and that is associated with the team to which the player character belongs (ally team) when losing to the player character and moves toward the enemy base while attacking the enemy player character (hereinafter, it may be referred to as a "second special character").

Specifically, when the player character and the first special character fight against each other, the special character control unit 57 refers to the information indicating the determination result received from the character state determination unit 50, and causes the first special character to take over the points possessed by the player character who defeats the first special character when the fight result between the player character and the first special character indicates the victory of the player character. Then, the special character control unit 57 controls the first special character and causes the first special character to advance toward the nearest enemy base 312 of the enemy team from the place where the first special character lost to the player character. When the first special character enters a predetermined range from the enemy base 312, the special character control unit 57 supplies information indicating that the first special character is within the range to the scoring unit 70.

When the first special character is attacked by the enemy player character, the special character control unit 57 reduces the HP of the first special character in response to the attack. Then, the special character control unit 57 can eliminate the first special character when the HP of the first special character becomes zero. In this case, the special character control unit 57 may also erase the points taken over from the player character by the first special character.

Further, in a case where the player character and the second special character fight against each other, the special character control unit 57 refers to the information indicating the determination result received from the character state determination unit 50, and causes the second special character to belong to the team of the player character when the fight result between the player character and the second special character indicates the victory of the player character. Then, the special character control unit 57 controls the second special character and causes the second special character to advance toward the nearest enemy base 312 of the enemy team from the place where the second special character loses to the player character. The special character control unit 57 causes the second special character to attack the enemy player character existing within a predetermined range from the second special character. When the second special character enters a predetermined range from the enemy base 312, the special character control unit 57 supplies information indicating that the second special character is within the range to the scoring unit 70.

When the second special character is attacked by the enemy player characters, the special character control unit 57 reduces the HP of the second special character in response to the attack. Then, the special character control unit 57 can eliminate the second special character when the HP thereof becomes zero.

The experience value giving unit 60 gives the experience value to the player character. The experience value is a value earned by the player character, and the level is a numerical value determined according to a cumulative total of the given experience values, and is a numerical value representing a rank of the player character. When the experience value earned by the player character satisfies a predetermined condition (for example, when the experience value exceeds a predetermined threshold value), the level of the player character can be raised stepwise.

The experience value giving unit 60 gives a predetermined experience value to the player character based on the information indicating the fight result received from the fight result determining unit 45. That is, the experience value giving unit 60 gives the experience value to the player character when the player character wins the fight against the neutral character and/or the special character, and/or when the player character wins the fight against the enemy player character. When the player character wins against the enemy player character, the experience value giving unit 60 may give a higher experience value than the experience value given when the player character wins against the neutral character. The experience value giving unit 60 can give a predetermined experience value to the player character based on a lapse of game time, give the player character an experience value when the player character supplies points to the enemy base, and/or give a predetermined experience value to the player character when information from the base control unit 80, which will be described later, indicates destruction of the enemy base by the player character.

The experience value giving unit 60 can continuously give a predetermined amount of the experience value to the player character from a start time to an end time of the game. On the other hand, when the player character loses fight against another character, the neutral character, and/or the special character, and the character state determination unit 50 moves the player character to the ally headquarter 302, the experience value giving unit 60 can prevent giving the experience value to the player character for a period of time from a time when the player character loses to a time when the movement to the ally headquarter 302 is completed.

Further, the game system 1 can cause an item, whose experience value can be earned by the item being acquired by the player character, to appear at a predetermined position in the play field 300, appear by defeating the neutral character, or the like. When the player character acquires the item, the experience value giving unit 60 gives the player character the experience value. The experience value giving unit 60 supplies information regarding the experience value given to the player character to the evolution control unit 64.

The point giving control unit 62 controls the giving of the points possessed by the neutral character associated with the player to the player character in response to the neutral character reaching a predetermined state relative to the player character, e.g., based on the determination result of the fight result determination unit 45 and/or the ally character control unit 55. In some embodiments, when the player character wins against (e.g., defeats) the neutral character in fight against the neutral character or when the player character maintains a corresponding relationship with the neutral character when the neutral character is defeated by another player character, the point giving control unit 62 gives the points possessed by the neutral character to the player character. The point giving control unit 62 gives a predetermined number of points to the player character as well when the player character wins against the enemy player character in fight against the enemy player character.

When the player character wins against the special character in fight with the special character, the point giving control unit 62 may give a predetermined number of points to the player character. However, since the special character has an advantageous effect on the team to which the player character who wins against the special character belongs, from a viewpoint of game balance and the like, the point giving control unit 62 may not give the predetermined number of points to the player character when the player character wins against the special character.

Then, when the points are given to the player character, the point giving control unit 62 adds the points to be given to the points already possessed by the player character, and causes the player character to possess the added points. An upper limit can be set for the points that can be possessed by the player character (for example, an upper limit can be set such that the maximum number of points is 50 points or 100 points). When the points possessed by the player character reaches the upper limit, the point giving control unit 62 does not give points to the player character even if the player character newly defeats a neutral character. In this case, the point giving control unit 62 sets the points possessed by a scoring process by the scoring unit 70, which will be described later, to zero, and prohibits giving points to the player character even if the player character newly defeats a neutral character, unless the number of possessed points is less than the upper limit. By setting the upper limit on the points that can be possessed in this way, an incentive for the scoring process by the scoring unit 70, which will be described later, is more likely to act on the player.

When the player character possessing points loses fight against the enemy player character, the special character, and/or the neutral character, the point giving control unit 62 may reduce the points possessed by the player character by a predetermined amount. Further, the point giving control unit 62 may reduce the points possessed by the player character by a predetermined amount when a determination result indicating that the ally character on the play field 300 loses fight against the player character, the other neutral character, and/or the special character is acquired from the ally character control unit 55. The point giving control unit 62 causes the display unit 10 to display the number of the points possessed by the player character in the vicinity of the player character and/or in the vicinity of the character storage area.

When the player character wins against a new neutral character while a neutral character is already associated with the player (that is, while the ally character already exists), the character state determination unit 50 erases the ally character stored in the character storage area. When the player character and/or the ally character fight against a new neutral character and wins while the ally character is out of the character storage area and appearing in the play field 300, the character state determination unit 50 erases the ally character appearing in the play field 300. In these cases, although the ally character has been erased, the point giving control unit 62 does not have to reduce the points possessed by the player character, and does not have to change the points that can be earned by the player character depending on the remaining HP of the ally character at the time when the new neutral character is defeated.

The evolution control unit 64 evolves the player character based on the experience value given to the player character by the experience value giving unit 60. Specifically, the evolution control unit 64 may evolve the character when the player character reaches a predetermined level and/or when an experience value equal to or higher than a predetermined value is acquired. The evolution control unit 64 may enable the player character to use a predetermined skill in response to the evolution of the player character. The evolution control unit 64 may change the content of the skills that can be used by the player character and/or effects of the skills according to the level of the player character.

As described above, in the game system 1, a predetermined skill can be used by the player character based on the experience value earned by the player character. Therefore, in the game system 1, unlike games in the related art, the player does not need to purchase items such as weapons using in-game currency or the like in the game. Therefore, the player character can be smoothly strengthened without complicated operations and the game can be enjoyed.

When at least one of the player character and the ally character is located in a predetermined area provided in the play field 300, the scoring unit 70 sets the points given to the player character as a score of the ally team. Specifically, the scoring unit 70 converts the point values possessed by the player character into the score of the ally team of the player in response to a predetermined operation of the player received via the input unit 20 when at least one of the player character and the ally character is located in a predetermined area provided in the play field and completes a score transferring operation, e.g., being located within a predetermined range of the enemy base 312 of the enemy team provided in the play field 300. In this case, the character state determination unit 50 erases the ally character stored in the character storage area or the ally character appearing in the play field 300 when the scoring unit 70 scores the points of the ally team. Further, the scoring unit 70 supplies a supply value corresponding to the score to the enemy base 312 and accumulates the supply value in the enemy base 312. The scoring unit 70 supplies the score of each team to the outcome determination unit 85, and supplies information related to the supply value accumulated in the enemy base 312 to the base control unit 80.

Here, when the scoring unit 70 converts the points of the player character into the score of the ally team (that is, when the points are scored), and accumulates the supply value corresponding to the points in the enemy base 312, the scoring unit 70 may complete scoring and accumulation when a predetermined time has elapsed. That is, the scoring unit 70 can prevent completing the scoring and the accumulation of the supply value in response to the operation being interrupted by another character or until a predetermined time elapses from a time when the player character enters a predetermined range of the enemy base 312. The scoring unit 70 can score the points at one enemy base 312 until the durability value of the one enemy base 312, which will be described later, reaches an upper limit. The scoring unit 70 may not start the lapse of a predetermined time when the player character only enters a predetermined range from the enemy bases 312, and may start the lapse of the time after the player performs the scoring operation.

The scoring unit 70 may shorten the predetermined time required for completing the scoring and the accumulation of the supply value when a predetermined special character (for example, the first special character) belonging to the ally team exists within a predetermined range from the enemy base 312. In this case, a player character belonging to the ally team that exists within a predetermined range from this special character and that exists within a predetermined range from the enemy base 312 can score the possessed points and supply the supply value corresponding to the score obtained by the scoring to the enemy base 312 at the time when the shortened predetermined time has elapsed.

Further, when the scoring unit 70 receives information indicating that the first special character is located within a predetermined range from the enemy base 312 from the special character control unit 57, the scoring unit 70 uses at least the points taken over by the first special character as the score of the ally team, supplies the supply value corresponding to the score to the enemy base 312, and accumulates the supply value in the enemy base 312. When the scoring unit 70 receives information indicating that the second special character is located within a predetermined range from the enemy base 312 from the special character control unit 57, the scoring unit 70 can use the points possessed by the second special character as the score of the ally team, supply the supply value corresponding to the score to the enemy base 312, and accumulate the supply value in the enemy base 312.

Further, the scoring unit 70 limits generation of effects of the ally character when the points possessed by the player character are used as the score of the ally team of the player character. For example, the scoring unit 70 erases the ally character stored in the character storage area or the ally character appearing in the play field 300. Here, the ally character may be erased immediately after scoring, or the ally character may be erased after a predetermined time has elapsed after the scoring. Alternatively, the scoring unit 70 may change status of the ally character without erasing the ally character. For example, the scoring unit 70 may reduce the HP, attack power, defense power, and the like of the ally character as the points are scored. Accordingly, the player can choose whether to score the points even if the ally character is weakened, or to use the ally character as a joint fight member without weakening the ally character or scoring the points. When the points are used as the score of the ally team, the scoring unit 70 may eliminate the effect of the ally character generated in a predetermined area of the play field 300.

First, a predetermined durability value is set for each base, that is, the ally base and the enemy base. When a plurality of bases exist, the durability value of each base may be the same or different. However, from a viewpoint of improving strategy of the game, when a plurality of bases exist, it is possible to set an upper limit on the durability value of each base and make the durability value of each base different from each other. For example, when a plurality of enemy bases 312 exist in the play field 300, the durability value of the enemy base 312 may be set lower as closer to the ally headquarter 302, and the durability value of the enemy base 312 may be set higher as farther away from the ally headquarter 302. For the enemy base 312 closest to the enemy headquarter 304 (final base), it is not necessary to set a substantial upper limit on the durability value thereof. A high durability value corresponds to an increase in the number of points that the opponent team can score. When the total value of the supply values accumulated in the enemy base 312 by the scoring unit 70 becomes equal to or higher than the durability value, the base control unit 80 stops function of the enemy base. The base control unit 80 also controls the ally bases 310 in the same manner. The base control unit 80 supplies information indicating control results to the experience value giving unit 60 and the outcome determination unit 85.

When a plurality of bases exist, the base control unit 80 can stop function from the base near the headquarter of the team to which the player character belongs (the ally headquarter 302 for the ally team, the enemy headquarter 304 for the enemy team). For example, when the player character is a player character of the ally team, and a plurality of enemy bases 312 exist at intervals from a side close to the ally headquarter 302 toward the enemy headquarter 304, the base control unit 80 can prevent the function of an enemy base 312 next to one enemy base 312 closest to the ally headquarter 302 (that is, the enemy base 312 second close to the ally headquarter 302) from being stopped only after stopping the function of the one enemy base 312 (that is, after destroying the one enemy base 312).

When a player character of the team to which a predetermined base belongs is within a predetermined range from the base (for example, when a player character of the ally team or an ally player character is within the predetermined range from the ally base), the base control unit 80 can generate an effect that is advantageous to the player character. The advantageous effect is, for example, to gradually recover the HP of the player character of the ally team within the predetermined range from the ally base with a lapse of time, to improve the attack power, the defense power, and the like for a certain period of time by a certain percentage, and the like. Once the player character of the team to which the base belongs enters the predetermined range from the base, the base control unit 80 may continuously generate the advantageous effect for a predetermined time even when the player character goes out of the predetermined range.

When a player character of one team and/or an ally character of the player character exists within a predetermined range from a base of the other team, the base control unit 80 may cause the base to perform an attack on the player character and/or the ally character of the player character within the range. However, from a viewpoint of easiness of intuitively understanding the progress of the game, the base control unit 80 may not cause the base to attack the characters.

The outcome determination unit 85 ends the game when a predetermined game time has elapsed, and determines the outcome of the game based on the score of each team at an end time. The outcome determination unit 85 determines the outcome of the game based on information received from the scoring unit 70 and/or information received from the base control unit 80. That is, the outcome determination unit 85 determines the outcome of the game based on a total score of the score obtained by scoring the points according to instructions of the player and the score obtained by scoring the points according to actions of the special character, rather than the points possessed by each character. The outcome determination unit 85 compares the scores of the teams and determines a team having a highest score as a winning team. The outcome determination unit 85 causes the display unit 10 to display the outcome of each team together with the score of each team.

Within the play field 300, a plurality of bases of each team are provided at intervals. That is, a plurality of bases of the ally team (ally base) and a plurality of bases of the enemy team (enemy base) are provided at predetermined intervals. When a player character of a team different from a team to which one base and another base next to the one base belong and an ally character of the player character invades between these bases, the restriction generation unit 87 applies a restriction to the movement of the player character and the ally character. The restriction includes, for example, a restriction that slows down the movement speed, an effect that reduces the HP, and the like. For example, when the player character of the ally team and/or the ally character invades between the one enemy base and the other enemy base next to the one enemy base, the restriction generation unit 87 can slow down the movement speed of the player character and/or the ally character. The restriction generation unit 87 may display a situation in which the movement is limited on the display unit 10. For example, the restriction generation unit 87 may display the situation in which the movement is limited by superimposing a predetermined mark, pattern, or the like around the player character and/or the ally character whose movement is limited.

Here, when a predetermined restriction is applied between the one base and the other base located next to the one base, the restriction generation unit 87 releases the predetermined restriction when the function of at least one of the one base or the other base is stopped by the base control unit 80. The restriction generation unit 87 can also enable stopping of the function of a base located next to one base of one team near the headquarter of the other team on condition that the function of the one base be stopped. That is, when a plurality of bases (for example, enemy bases) exist, the restriction generation unit 87 enables stopping of the function of the enemy base second closest to the ally headquarter (that is, enables an ally player character to destroy this enemy base) after the function of the enemy base closest to the ally headquarter is stopped (that is, after an ally player character destroys this enemy base).

In the game system 1, a time limit for executing the game is set in advance. In the play field 300, an extension base capable of extending the time limit may be provided, or it may appear after a predetermined time has elapsed from the start of the game. The time limit control unit 90 extends the time limit by a predetermined time when one or more player characters belonging to the ally team exist within a predetermined range from the extension base for a predetermined time (hereinafter may be referred to as "extendable time"). Here, the extension base may be destructible by an opponent player character attacking and dealing predetermined damage. When one or more player characters belonging to the ally team are within a predetermined range from the extension base and an enemy player character attacks the one or more player characters of the ally team, the time limit control unit 90 may reset count of the extendable time or extend the extendable time itself FIG. 5 shows an outline of an example of a movement instruction and the like to the player character by the input unit in the game system according to the present embodiment.

In the game system 1, the player can operate a player character 400 in the play field 300, which is a virtual space, by using the information terminal 3 provided with the touch panel as an example. Here, the game system 1 displays a movement instruction input area 212 for receiving the movement instruction to the player character 400 on the display unit 10 in a manner that can be perceived by the player. The movement instruction input area 212 includes a direction display area 214 indicating a movement direction of the player character 400, and a direction instruction unit 216 that receives the movement direction and the movement instruction of the player character 400 from the player.

Figure 5:
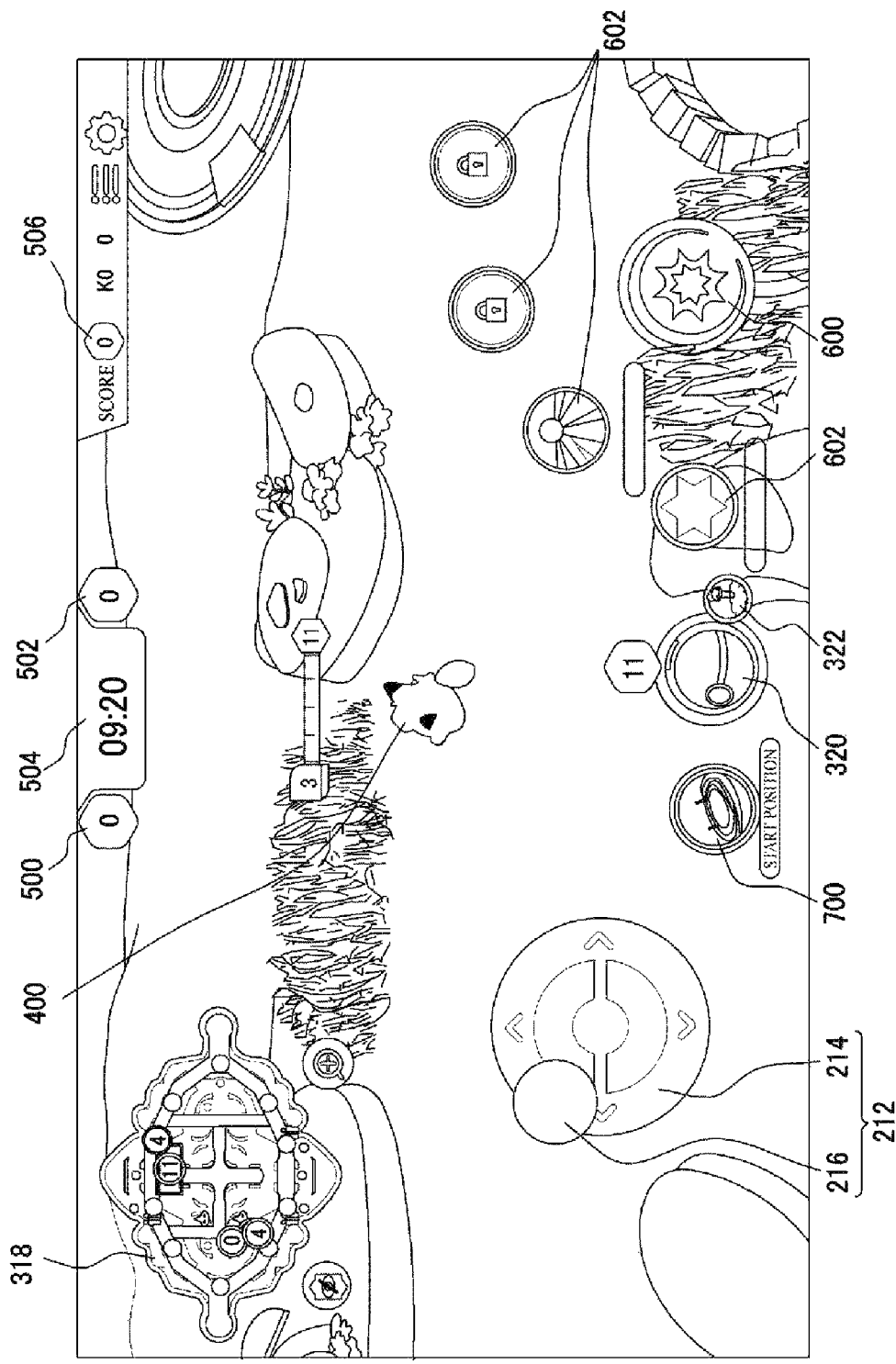
FIG. 5 is a schematic diagram of a movement instruction to a player character by an input unit according to the present embodiment.

For example, as shown in FIG. 5, the display control unit 15 causes the direction display area 214 to be displayed in a predetermined area of the display unit 10. When the input unit 20 does not receive the movement instruction for the player character 400 from the player or at a moment when the input unit 20 receives the movement instruction, the display control unit 15 causes the display unit 10 to display the direction instruction unit 216 at a predetermined position (for example, center) of the direction display area 214. When the input unit 20 receives the movement instruction from the player for the player character 400, for example, when a finger of the player touches the vicinity of the direction display area 214 of the touch panel and the movement direction and the movement instruction (for example, a movement instruction by sliding the finger in a predetermined direction) of the player character 400 by the finger of the player are received, the direction instruction unit 216 is displayed at a position touched by the finger (hereinafter, the position where a finger that was not in contact with the touch panel touches the touch panel is referred to as an "initial position"). The direction instruction unit 216 is displayed in an area that can be superimposed and displayed on the direction display area 214.

As shown in FIG. 5, the input unit 20 detects a current position of the finger on the touch panel (hereinafter, the position where the finger is currently in contact with the touch panel is referred to as the "current position", in which stage it is assumed that the finger is not substantially separated from the touch panel from the "initial position" to the "current position"). The display unit 10 causes the display unit 10 to display how the direction instruction unit 216 is moved to a predetermined position around the direction display area 214, which is a position corresponding to a direction from the initial position to the current position, based on the detection by the input unit 20. In the example of FIG. 5, the movement instruction of the player character 400 is input in an upper left direction of the play field 300. Then, the character action control unit 30 moves the player character 400 based on the instruction received by the input unit 20. In the example of FIG. 5, the player character 400 moves in the upper left direction.

The direction instruction unit 216 may be moved and displayed inside of and along the periphery of the direction display area 214. Then, the input control unit 210 may erase the display of the direction instruction unit 216 when the finger stops touching the touch panel. When the finger subsequently touches the vicinity of the direction display area 214, the input control unit 210 repeats the same control as described above. In the above example, the input control unit 210 receives the instruction from the player via the touch panel, but the input control unit 210 can also receive the instruction from the player via another input unit 20 such as a mouse or a keyboard.

The display unit 10 displays an attack instruction area 600 that receives an attack instruction for the player character 400 to attack a target character such as a neutral character or an enemy player character, and a skill generation area 602 that receives a generation instruction of a predetermined skill. The input control unit 210 receives instructions from the player to the attack instruction area 600 and the skill generation area 602, and supplies the received instructions to the fight control unit 40. The fight control unit 40 controls the fight between the player character 400 and the target characters based on the received instructions. When use of the predetermined skill by the player character 400 is not permitted, a mark indicating that the skill cannot be used is displayed in the skill generation area 602. When the use of the skill is permitted by acquisition of experience values, level up, evolution, and the like, a mark indicating the skill that can be used is displayed in the skill generation area 602.

The display unit 10 can display, in predetermined areas, an overall view 318 that is a reduced map of the entire play field 300, the character storage area 320; a stored character presentation 322 that presents the ally character stored in the character storage area 320; an ally team score 500 that indicates the score of the ally team; an enemy team score 502 that indicates the score of the enemy team; a remaining game time 504 that indicates a remaining time of the game time; and a player score 506 that indicates the score of the player per se. In the overall view 318, positions of the ally player character, the enemy player character, the neutral character, and/or the special character may be displayed in real time, and for the ally player character and the enemy player character, points possessed by each character may be displayed. The display unit 10 can also display a return instruction area 700 that the player character 400 can be returned to the ally headquarter 302 by costing a predetermined time in response to an instruction of the player received via the input unit 20 regardless of the position of the player character 400 in the play field 300 at a time of the instruction.

In the following description, in order to simplify the description, illustration and description of the movement instruction input area 212 will be omitted.

Figure 6:
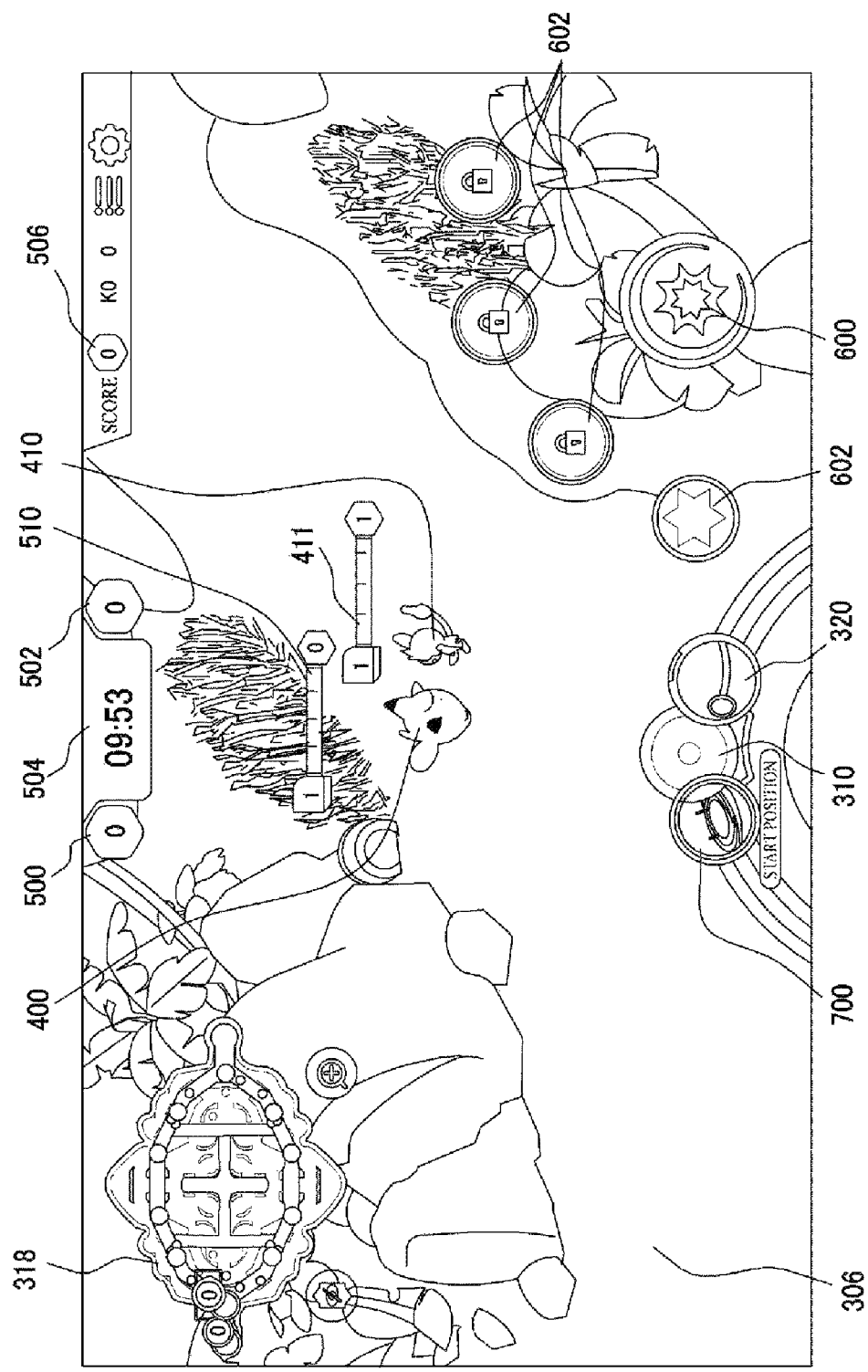
FIG. 6 is a schematic diagram of fight between the player character and a neutral character in the game system according to the present embodiment.
Figure 7:
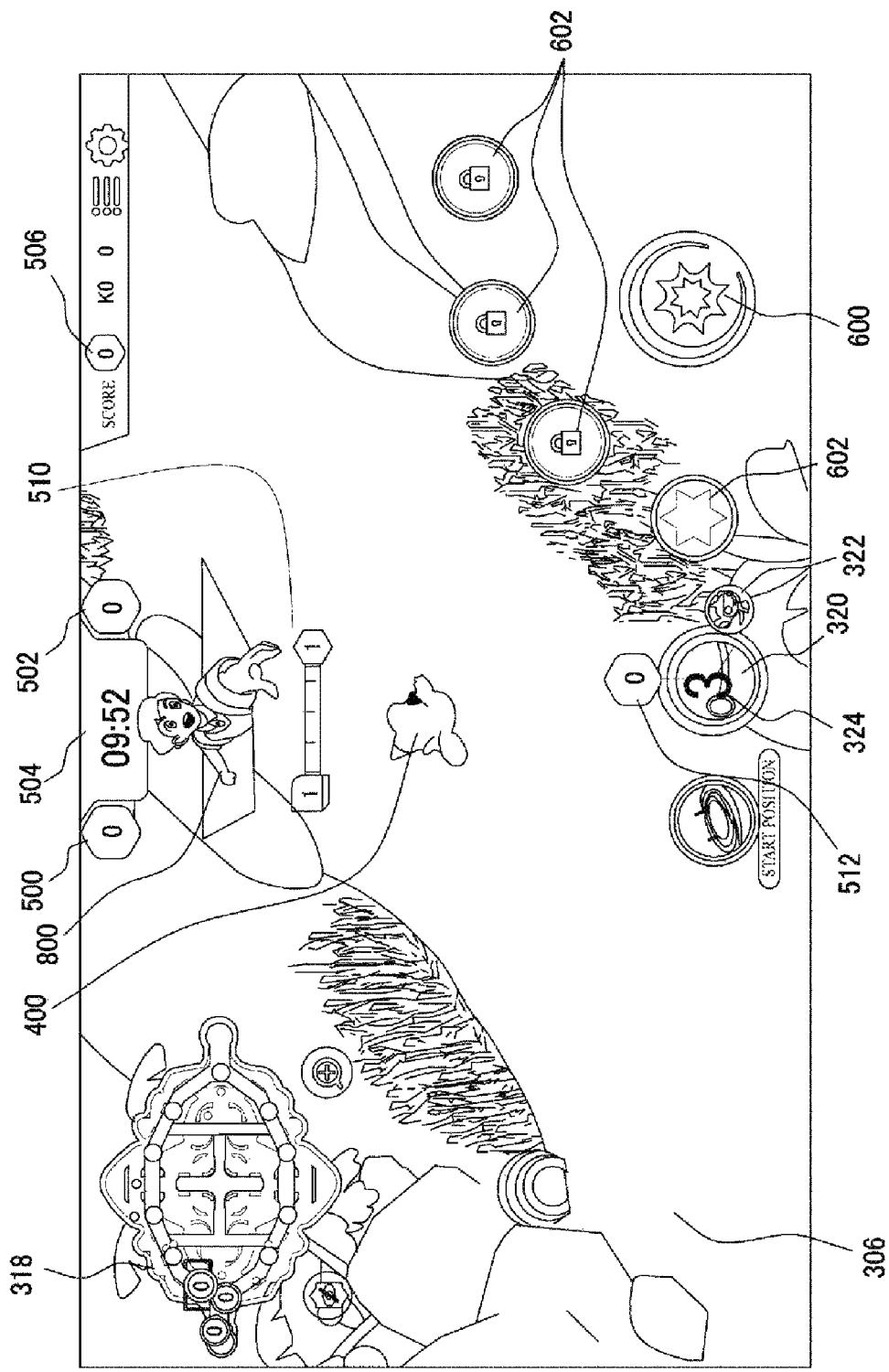
FIG. 7 is a schematic diagram of fight between the player character and the neutral character in the game system according to the present embodiment.
Figure 8:
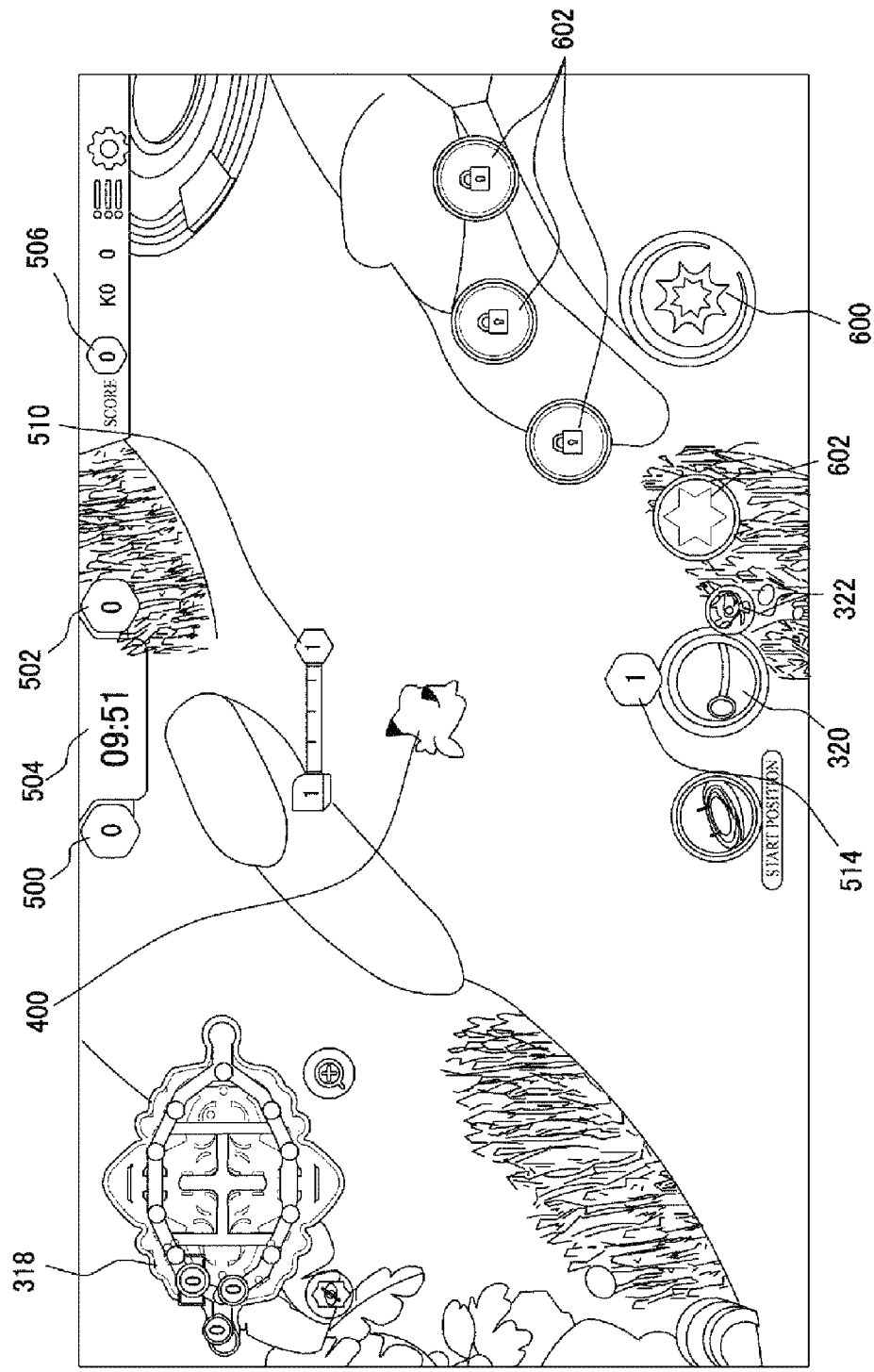
FIG. 8 is a schematic diagram of fight between the player character and the neutral character in the game system according to the present embodiment.

FIGS. 6-8 show an outline of fight between the player character and the neutral character in the game system according to the present embodiment. Specifically, FIG. 6 shows an outline of a state at a start of an attack, FIG. 7 shows an outline of a state immediately after victory of the player character 400, and FIG. 8 shows an outline of point display.

For example, as shown in FIG. 6, when a neutral character 410 is within a predetermined range from the player character 400 moving in the lane 306 of the play field 300 in response to operation of the player, the fight control unit 40 enables the player character 400 to attack the neutral character. Then, when receiving an attack instruction to the neutral character 410 from the player via the input unit 20, the fight control unit 40 starts fight between the player character 400 and the neutral character 410. For example, when the input unit 20 receives an instruction for the attack instruction area 600 from the player, the fight control unit 40 causes the player character 400 to perform an attack (for example, a normal attack that can be used by the player character 400 from beginning of the game) on the neutral character 410.

Here, the display unit 10 can display status 510 of the player character 400 in the vicinity of the player character 400 and status 411 of the neutral character 410 in the vicinity of the neutral character 410. The status displays, for example, a level, HP, and possessed points of each character. As an example, the status includes a rectangular portion that indicates the HP by the length of a horizontal bar, a roughly square level display area that displays the level of a character numerically at the left end of the rectangular portion, and a hexagonal point display area that indicates the points possessed by the character at the right end of the rectangular portion. In an example of FIG. 6, the status 510 indicates that the level of the player character 400 is "1", the HP is full, and the possessed points is zero, and the status 411 indicates that the level of the neutral character 410 is "1", the HP is full, and the possessed points is "1".

The fight control unit 40 causes the display unit 10 to display situations (for example, a situation of decrease in the HP, and the like) of the status 510 and the status 411, which change in response to the fight between the player character 400 and the neutral character 410. Then, the fight result determination unit 45 determines that the player character 400 wins against the neutral character 410 when the HP of the neutral character 410 becomes zero due to the attack by the player character 400, for example. Next, the character state determination unit 50 associates the neutral character 410 with the player of the player character 400 based on the determination result of the fight result determination unit 45. As a result, the player acquires the neutral character 410.

As shown in FIG. 7, the character state determination unit 50 erases the display of the neutral character 410 from the play field 300 and stores the defeated neutral character 410 as an ally character in the character storage area 320 for the player. For example, the display unit 10 displays a ball-shaped character storage area 320 at a predetermined position, and displays the stored character presentation 322 that presents the ally character stored in the character storage area 320 at or near a position in contact with the character storage area 320. In the example of FIGS. 6 and 7, since the neutral character 410 has become an ally character, it can be understood by referring to the stored character presentation 322 that the neutral character 410 is stored as an ally character in the character storage area 320. The stored character presentation 322 presents, for example, an image of the ally character, or the stored character presentation 322 presents the name of the ally character. In this case, for the player to easily understand that the player character 400 has acquired the neutral character 410, the display unit 10 may display a performance display 800 indicating the acquisition of the neutral character and the earning of points/experience value at a predetermined position.

A predetermined time may be set as a requisite before the appearance of the ally character from the character storage area 320 to the play field 300 and the storage of the ally character in the character storage area 320 can be repeated by the ally character control unit 55. That is, the ally character may be prohibited from appearing in the play field 300 until the predetermined time elapses after the ally character is stored in the character storage area 320. The display unit 10 may superimpose the lapse of the predetermined time on the character storage area 320 and display the lapse of the predetermined time in a manner that can be perceived by the player. For example, the display unit 10 performs a countdown display 324 for a time until the control of the appearance of the ally character in the play field 300 and the storage in the character storage area 320 by the ally character control unit 55 becomes possible. After the countdown display 324 ends, the ally character control unit 55 enables the ally character stored in the character storage area 320 to appear in the play field 300 in response to an instruction from the player.

Further, since the player character 400 has won the neutral character 410, the point giving control unit 62 gives points possessed by the neutral character 410 to the player character 400. In this case, the point giving control unit 62 updates the point display area of the status 510 of the player character 400, and causes the display unit 10 to display that the player character earns the points. In the example of FIG. 7, since the points possessed by the neutral character 410 is "1", the points earned by the player character is also "1", and since the possessed points of the player character before this point is earned is "0", "1" is displayed in the point display area of the status 510.

The point giving control unit 62 can also display the points earned by the player character as the point display 512 in the vicinity of the character storage area 320. However, the point giving control unit 62 displays the point display 512 as the points that the player character possesses before defeating the neutral character 410 and earning the points of the neutral character 410, until the predetermined time has elapsed before the appearance of the ally character from the character storage area 320 to the play field 300 and the storage of the ally character in the character storage area 320 can be repeated by the ally character control unit 55. In the example of FIG. 7, since the points possessed by the player character is zero before the player character 400 defeats the neutral character 410 (as shown in the status 510 displayed in FIG. 6), the point display 512 is also zero. When the player character 400 possesses a predetermined number of points before defeating the neutral character 410, the point display 512 displays the predetermined number of points.

When the predetermined time has elapsed before the appearance of the ally character from the character storage area 320 to the play field 300 and the storage of the ally character in the character storage area 320 can be repeated by the ally character control unit 55 (in this case, the above-mentioned countdown display is erased), as shown in FIG. 8, the point giving control unit 62 updates the display of the point display 512 according to the points possessed by the neutral character 410 defeated by the player character 400. That is, in an example of FIG. 8, since the points possessed by the neutral character 410 defeated by the player character 400 is "1" as shown in FIG. 6, the "0" of the point display 512 shown in FIG. 7 is updated to "1" of point display 514 shown in FIG. 8. As a result, "1" is also displayed on the point display 514.

Since the player character 400 wins the fight against the neutral character 410, the experience value giving unit 60 gives the player character 400 a predetermined experience value. The experience value giving unit 60 displays the level of the player character 400, which is determined according to the cumulative total of the experience values earned by the player character 400, in the level display area of the status 510.

Figure 9:
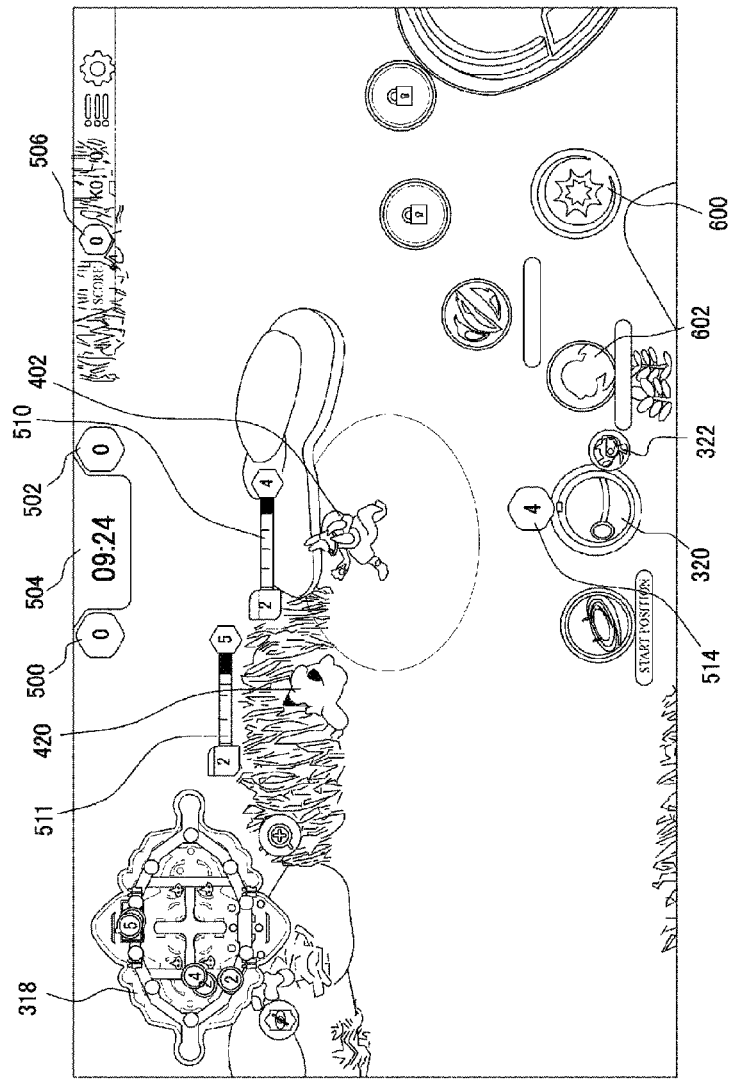
FIG. 9 is a schematic diagram of a joint fight between the player character and an ally character in the game system according to the present embodiment.
Figure 10:
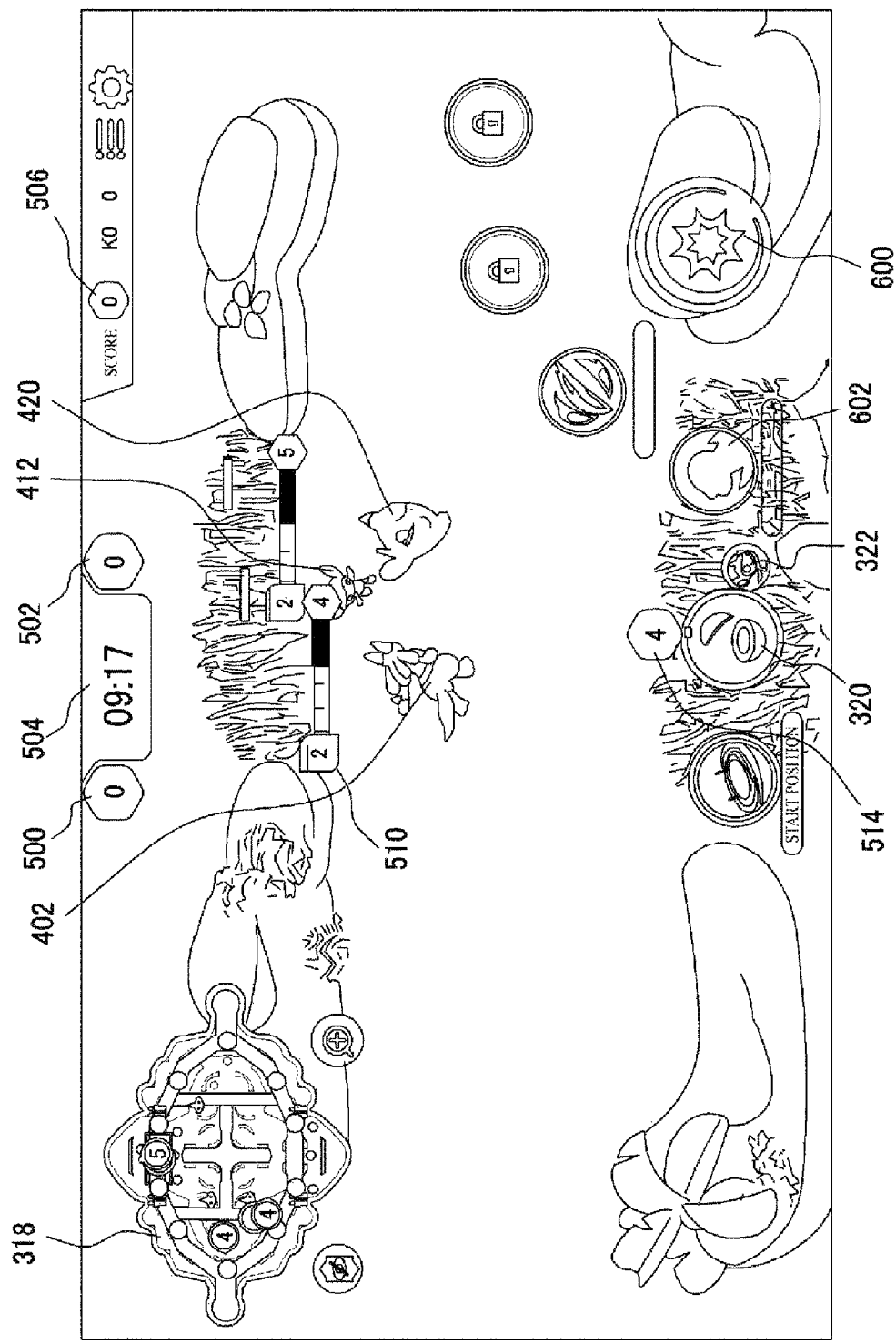
FIG. 10 is a schematic diagram of a joint fight between the player character and the ally character in the game system according to the present embodiment.

FIGS. 9 and 10 show an outline of how the player character and the ally character fight together in the game system according to the present embodiment. Specifically, FIG. 9 shows an example of a state in which the ally character is stored in the character storage area 320, and FIG. 10 shows an example of a state in which the ally character appears in the play field 300.

First, as shown in FIG. 9, it is assumed that a player character 402 is battling against an enemy player character 420 while an ally character of the player character 402 is stored in the character storage area 320. The stored character presentation 322 enables understanding of the ally character stored in the character storage area 320. The fight control unit 40 controls the fight between the player character 402 and the enemy player character 420. The fight control unit 40 causes the display unit 10 to display the status 510 of the player character 402 and the status 511 of the enemy player character 420, which change in response to the fight between the player character 402 and the enemy player character 420. The status 510 is displayed in the vicinity of the player character 402, and the status 511 is displayed in the vicinity of the enemy player character 420.

Specifically, when the enemy player character 420 exists within a predetermined range from the player character 402, the fight control unit 40 enables the player character 402 to attack the enemy player character 420. Then, when the fight control unit 40 receives an attack instruction against the enemy player character 420 from the player via the input unit 20, the fight control unit 40 starts fight between the player character 402 and the enemy player character 420. For example, when the input unit 20 receives an instruction of the player to the attack instruction area 600, the fight control unit 40 causes the player character 402 to execute an attack on the enemy player character 420, and when the input unit 20 receives an instruction of the player to the skill generation area 602, the fight control unit 40 causes the player character 402 to execute an attack on the enemy player character 420 by a skill. When the player causes the player character 402 to perform an attack by a skill via the skill generation area 602, the fight control unit 40 may prohibit the player character 402 from executing the skill again until a predetermined time has elapsed from the execution of the skill.

As shown in FIG. 10, the ally character control unit 55 causes the ally character 412 stored in the character storage area 320 to appear in the play field 300 based on an instruction from the player that makes the ally character 412 appear in the play field 300. Here, the "ally character stored" refers to the ally character 412 that can appear in the play field 300 at any timing in response to the instruction of the player. The stored character presentation 322 presents the ally character 412 appearing in the play field 300. Specifically, the ally character control unit 55 causes the ally character 412 stored in the character storage area 320 to appear in the play field 300 in response to the instruction of the player (for example, an instruction by the player by tapping the character storage area 320) to the character storage area 320 received via the input unit 20. Then, the ally character control unit 55 controls the appearing ally character 412 to move around the player character 402 so as to automatically follow the player character 402. Further, the ally character control unit 55 automatically executes an attack on the enemy player character 420 existing within a predetermined range from the ally character 412. In the example of FIG. 10, the ally character 412 is controlled by the ally character control unit 55 and executes an attack on the enemy player character 420. The ally character control unit 55 further stores the ally character 412 appearing in the play field 300 in the character storage area 320 in response to a further instruction of the player to the character storage area 320 received via the input unit 20.

When the ally character 412 appears in the play field 300, the ally character control unit 55 can also display a display icon of the character storage area 320 to indicate a situation where the ally character 412 is outside. As an example, under a case where the character storage area 320 is represented by a ball-shaped display icon, a state in which the ball is closed when the ally character is stored is shown as shown in FIG. 9, and a state in which the ball is open when the ally character appears in the play field 300 is shown as shown in FIG. 10.

When the enemy player character 420 is defeated by an attack by the player character 402 and/or the ally character 412, the experience value giving unit 60 gives a predetermined amount of experience value to the player character 402. Here, the ally character control unit 55 erases the ally character 412 from the play field 300 when the ally character 412 is defeated by an attack from the enemy player character 420. As a result, the ally character possessed by the player disappears. Then, the point giving control unit 62 acquires a determination result indicating that the ally character 412 has lost from the ally character control unit 55, and reduces points possessed by the player character by a predetermined amount.

A method for fighting together with the ally character 412 is not limited to the above example, and can be realized by various methods. For example, movement of the ally character 412 and the attack on the enemy player character 420 by the ally character 412 may be executed based on operation instructions of the player, rather than automatically executed. In response to the instruction of the player to the character storage area 320 received via the input unit 20, the ally character 412 may not appear in the play field 300, and a predetermined game effect such as a skill or an item associated with the ally character 412 may be generated in a predetermined range in the play field 300. In this case, the ally character control unit 55 can restrict use of the skill or item associated with the ally character 412 when the player character satisfies a predetermined condition such as being defeated by an attack from the enemy player character 420.

Figure 11:
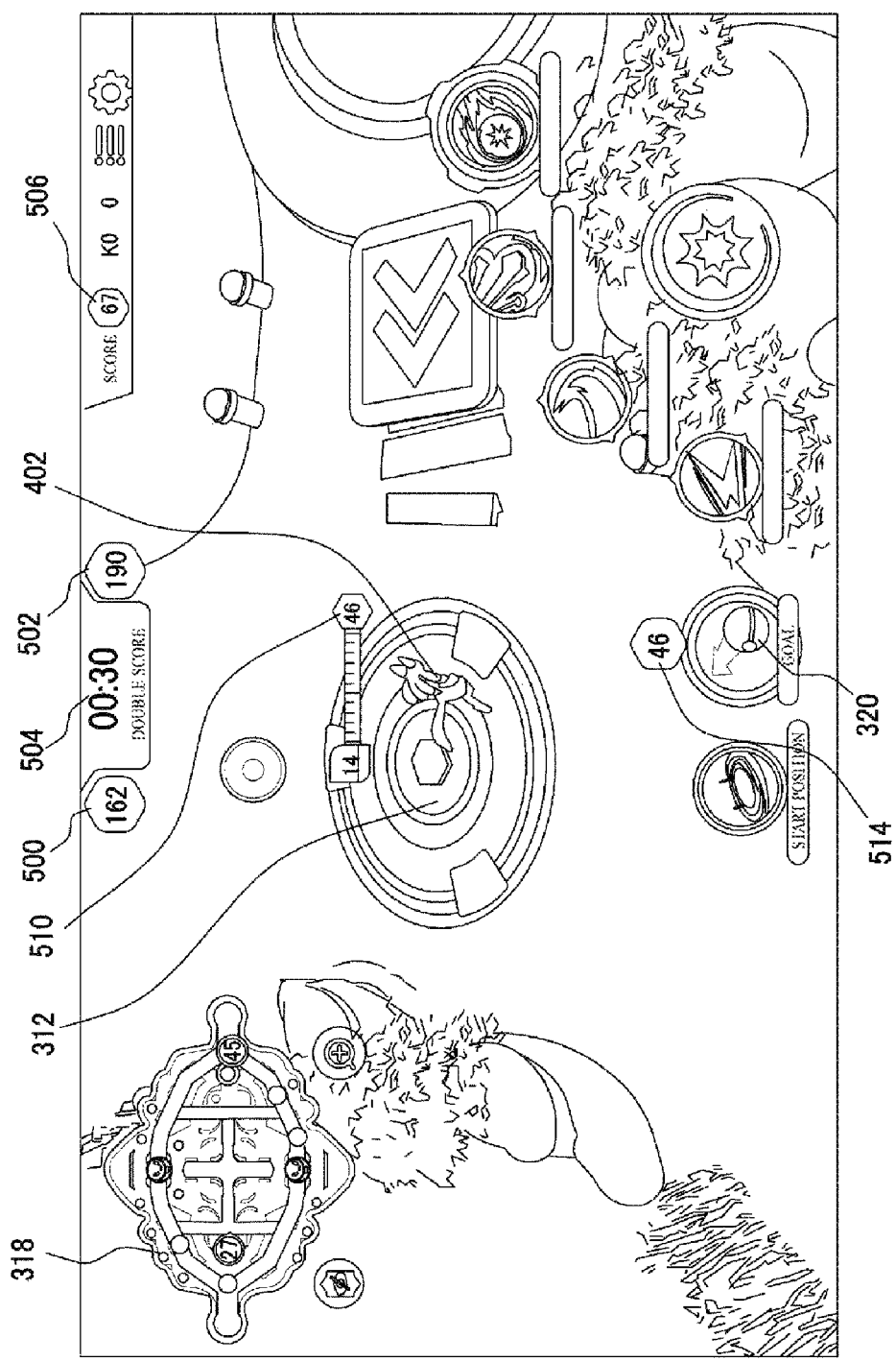
FIG. 11 is a schematic diagram of point scoring in the game system according to the present embodiment.
Figure 12:
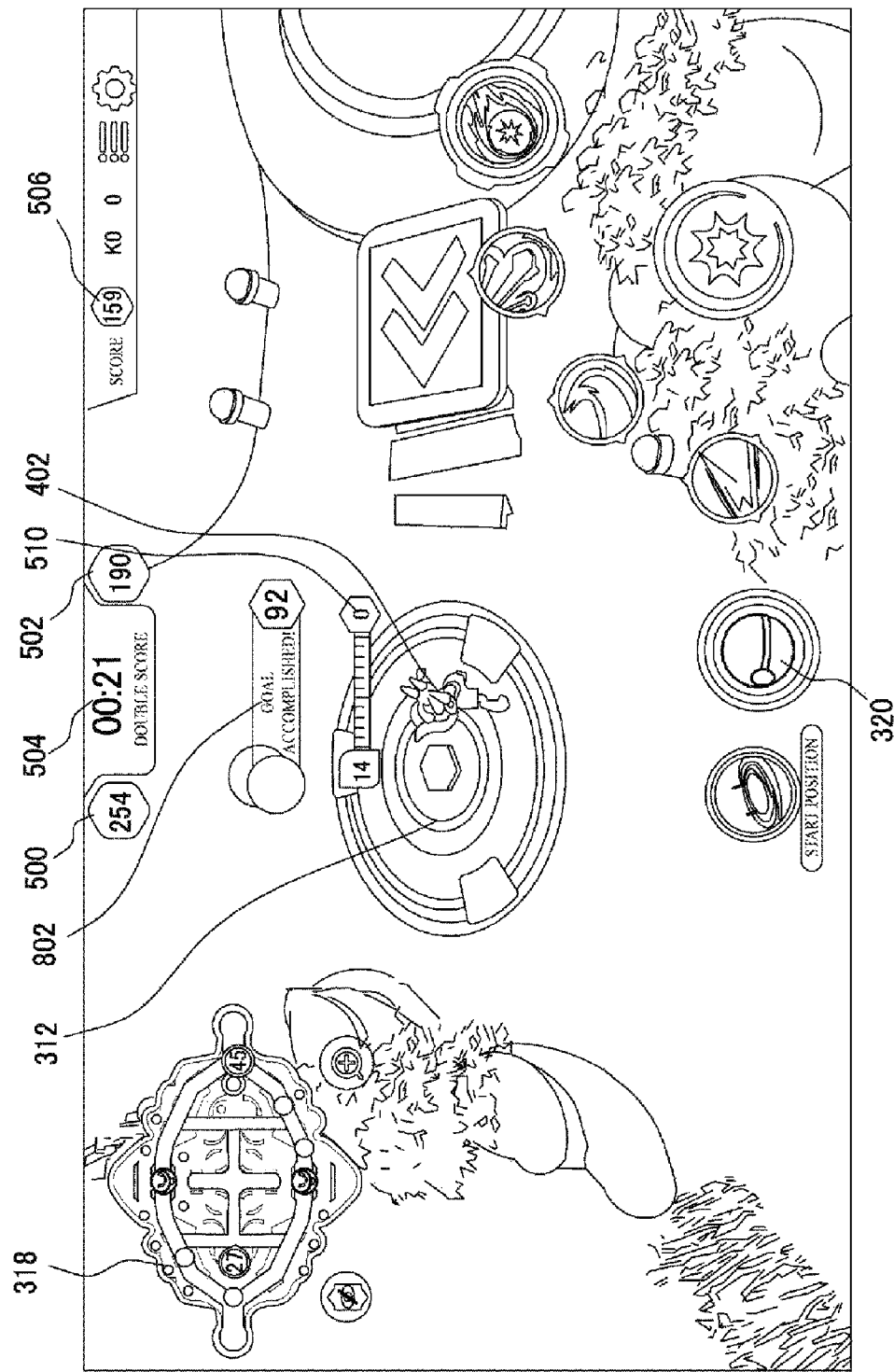
FIG. 12 is a schematic diagram of point scoring in the game system according to the present embodiment.

FIGS. 11 and 12 show an outline of an example of point scoring in the game system according to the present embodiment. Specifically, FIG. 11 shows an example of a state before the points possessed by the player character 402 are scored, and FIG. 12 shows an example of a state after the points possessed by the player character 402 are scored.

When the player character 402 possesses points, the scoring unit 70 can score the points as a score of the team to which the player of the player character 402 belongs under a predetermined condition. FIGS. 11 and 12 show an example in which a score is given to a team (ally team) of the player character 402. FIG. 11 shows that the ally team score 500 is "162" and the enemy team score 502 is "190", and the player score 506 shows that the points earned by the individual player up to a time of the state shown in FIG. 11 is "67". In FIG. 11, the remaining game time 504 is also displayed (FIG. 11 shows an example in which the remaining time is 30 seconds).

First, as shown in FIG. 11, the player character 402 possesses a predetermined number of points. The points possessed by the player character 402 are displayed in a point display area of the status 510 of the player character 402 and a point display 514 displayed in the vicinity of the character storage area 320 (in the example of FIG. 11, the player character 402 possesses "46" points. In the example of FIG. 11, the level of the player character 402 is displayed in the level display area and is level "14").

When the player character 402 enters a predetermined range from the enemy base 312 (hereinafter, it may be referred to as "enemy base area"), the points possessed by the player character 402 are set as the score of the ally team in response to a scoring instruction of the player received via the input unit 20. Specifically, the enemy base 312 has, for example, a substantially circular area. When the player character 402 enters this area, the scoring unit 70 can perform a display indicating that scoring can be done in the character storage area 320. In the example of FIG. 11, an arrow shape is added to the ball shape displayed in the character storage area 320, and a text "goal" is displayed.

Then, when the input unit 20 receives an instruction (for example, a tap operation) from the player to the character storage area 320 in this state, the scoring unit 70 executes a scoring process. Specifically, the scoring unit 70 does not score points until a predetermined time elapses from a time when the player gives an instruction to score to the character storage area 320, and the points are scored when the predetermined time elapses. That is, the scoring unit 70 executes a countdown process until scoring. Here, when the player character 402 goes out of the enemy base area or is defeated by the enemy player character 420 before the points are scored, the countdown process by the scoring unit 70 may be reset.

Then, when the predetermined time elapses, the scoring unit 70 scores the points possessed by the player character 402 as the score of the ally team. In the example of FIG. 12, the "46" points possessed by the player character 402 are converted into a score (scored) and added to the score of the ally team. When the points possessed by the player character 402 are scored, the scoring unit 70 sets the points possessed by the player character 402 to zero and displays this situation. For example, display of the point display area of the status 510 of the player character 402 is set to "0", and the point display 514 displayed near the character storage area 320 is erased.

After scoring the points into a score and adding the score to the score of the ally team, the scoring unit 70 updates and displays the display of the score of the ally team and display of a score of the individual player. The example of FIG. 12 shows that the ally team score 500 is "254" and the player score 506, which is the score of the individual player, is "159". When the scoring of the points is completed, the scoring unit 70 may display a display 802 indicating that the scoring is successful at a predetermined position of the display unit 10 (for example, a text display such as "Goal Accomplished!" can be displayed).

The scoring unit 70 may add a correction to the score that can be earned by each team when the remaining time of the game becomes equal to or less than a predetermined time. For example, in the example of FIG. 12, the scoring unit 70 sets the score that can be earned by each team to "double" when the remaining time of the game becomes equal to or less than the predetermined time. Therefore, although the points possessed by the player in the example of FIGS. 11 and 12 is "46", the score of the ally team by scoring is not "208" but "254", and the score earned by the individual player is not "46" but "92" (so the score of the individual player after scoring becomes to "159"). Therefore, the scoring unit 70 scores the points possessed by the player without correcting the points before the remaining time of the game becomes equal to or less than the predetermined time, and adds the score to the scores of the ally team and the individual player (for example, in the example of FIGS. 11 and 12, when the remaining time of the game is not equal to or less than the predetermined time, the "46" points possessed by the player are scored as a score of "46", and the score "46" is added to the score "162" of the ally team to obtain a score of "208", and added to the score "67" of the individual player to obtain a score of "113").

The scoring unit 70 supplies the supply value corresponding to the score obtained by scoring the points to the enemy base 312. The scoring unit 70 accumulates the supply value in the enemy base 312. The supply value may be the same as a value of the score. The base control unit 80 stops the function of the enemy base 312 when a total value of the supply values accumulated in the enemy base 312 by the scoring unit 70 becomes equal to or more than a predetermined durability value in the enemy base 312. After the function of the enemy base 312 is stopped, points cannot be supplied to the enemy base 312 and scored, and the supply value cannot be accumulated. Therefore, the players of the ally team aims at another enemy base 312, and aims to score the points and accumulate the supply value at the other enemy base 312 or stop the function of the other enemy base 312.

As an example in the present embodiment, a plurality of enemy bases 312 are arranged from a side close to the ally headquarter 302 toward the enemy headquarter 304, and the durability value of the enemy bases 312 can be set higher as the distance from the side close to the ally headquarter 302 increases. That is, the amount of points scored at the enemy base 312 on the side far from the ally headquarter 302 is set larger than the amount of points scored at the enemy base 312 on the side close to the ally headquarter 302. As a result, the player of the ally team aims to improve the level thereof by accumulating the experience value of the player character thereof while executing the game on the side close to the ally headquarter 302 at the start of the game, for scoring more points during the middle of the game to the end of the game, cause the player character to possess more points, and score the points at the enemy bases 312 on the side close to the enemy headquarter 304.

Figure 13:
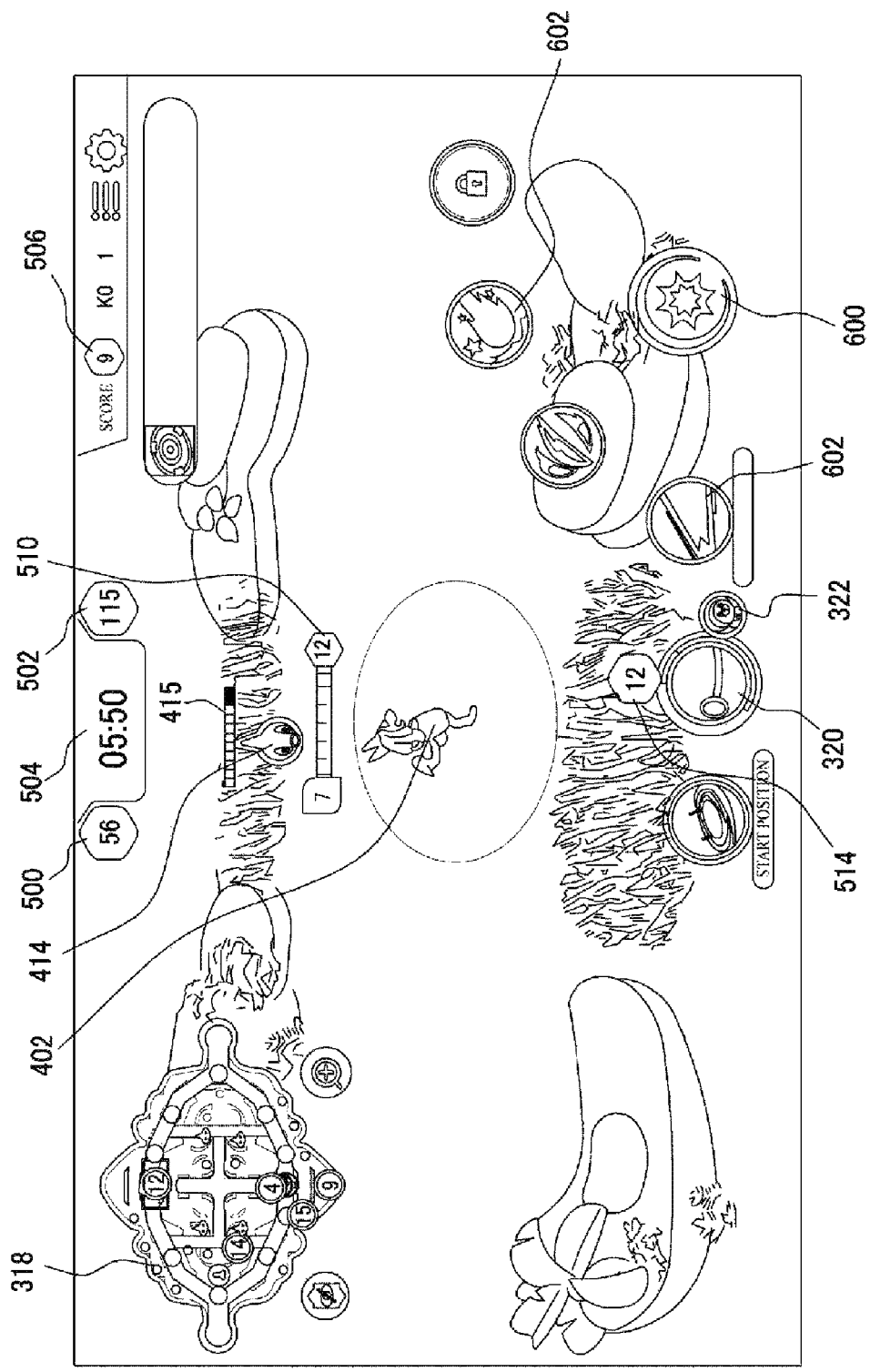
FIG. 13 is a schematic diagram of a first special character in the game system according to the present embodiment.
Figure 14:
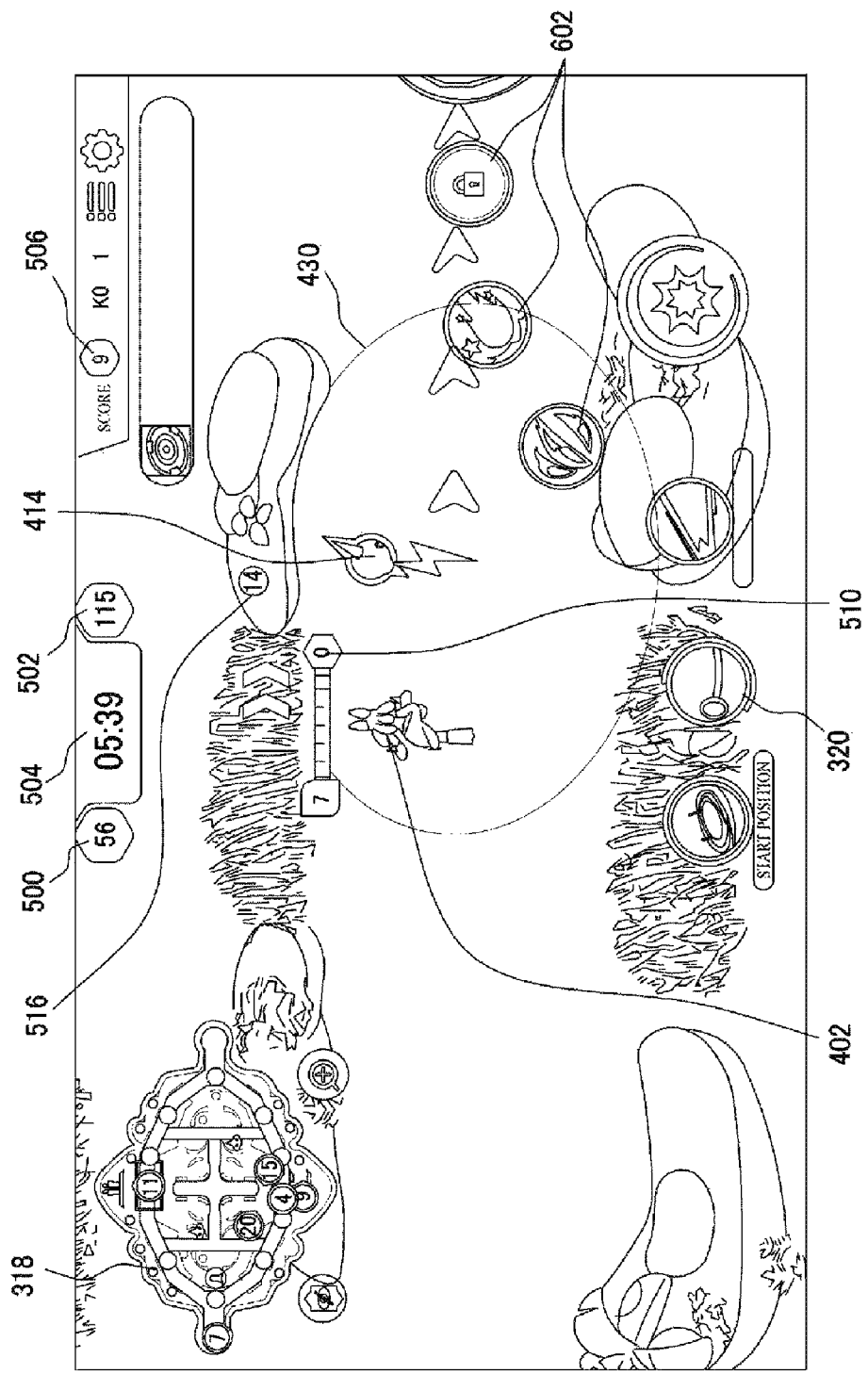
FIG. 14 is a schematic diagram of the first special character in the game system according to the present embodiment.

FIGS. 13 and 14 show an outline of an example of the first special character in the game system according to the present embodiment. Specifically, FIG. 13 shows an example of fight between the player character 402 and a first special character 414, and FIG. 14 shows an example in which the first special character 414 belongs to the ally team.

First, the appearance control unit 35 causes the first special characters 414 to appear at two predetermined positions in the play field 300 at the same time. For example, when the play field 300 is substantially an ellipse and the lanes 306 are provided along the vicinity of an outer circumference of the ellipse, the appearance control unit 35 causes the first special characters 414 to appear near two intersections of a minor axis of the ellipse and the lanes 306. As a result, chances of encountering the first special characters 414 can be equalized for the ally player characters of the ally team and the enemy player characters of the enemy team.

As shown in FIG. 13, when the first special character 414 exists within a predetermined range from the player character 402 existing in the play field 300 in response to an operation of the player, the fight control unit 40 enables the player character 402 to attack the first special character 414. Then, when the fight control unit 40 receives an attack instruction from the player against the first special character 414 via the input unit 20, the fight control unit 40 starts fight between the player character 402 and the first special character 414.

The fight control unit 40 causes the display unit 10 to display situations of the status 510 of the player character 402 and the status 415 of the first special character 414 that change in response to the fight between the player character 402 and the first special character 414 (for example, a situation of HP decrease and the like). The status 415 of the first special character 414 is displayed in the vicinity of the first special character 414. In the example of FIG. 13, the status 510 of the player character 402 indicates that the level of the player character 402 is "7" and that the player character already possesses "12" points (similarly, the point display 514 displayed near the character storage area 320 also indicates that the player character possesses "12" points).

For example, when the HP of the first special character 414 becomes zero due to the attack by the player character 402, the fight result determination unit 45 determines that the player character 402 wins against the first special character 414. Next, the character state determination unit 50 associates the first special character 414 with the team to which the player of the player character 402 belongs (ally team), based on the determination result of the fight result determination unit 45. Specifically, the character ID of the first special character 414 is associated with the team ID or the player ID. As a result, the first special character 414 belongs to the ally team.

When the ally player characters of the ally team and the enemy player characters of the enemy team attack the first special character 414 at the same time, and the first special character 414 is defeated, the fight result determination unit 45 may determine the character who made the last attack to make the HP of the first special character 414 zero (that is, a "last hit" character) as the winning character. In this case, the character state determination unit 50 assigns the first special character 414 to the team to which the winning character belongs.

As shown in FIG. 14, the special character control unit 57 causes the first special character 414 to take over the points possessed by the player character 402. That is, the special character control unit 57 delivers the points possessed by the winning character, which is the player character 402, to the first special character 414, adds the points to a predetermined number of points uniquely possessed by the first special character 414, and sets the added points as the points possessed by the first special character 414. In the example of FIG. 14, the "12" points possessed by the player character 402 are taken over to the first special character 414, and the first special character 414 has "14" points obtained by adding the "12" points to the "2" points that the first special character 414 possesses in advance. The special character control unit 57 displays the points of the first special character 414 in the vicinity of the first special character 414 (point display 516). When the special character control unit 57 takes over the points possessed by the player character 402 to the first special character 414, the special character control unit 57 sets point display of the status 510 to zero, and erases the point display 514 displayed in the vicinity of the character storage area 320. In this case, the special character control unit 57 also erases the ally character stored in the character storage area 320 and the ally character appearing in the play field from the character storage area 320.

Subsequently, the special character control unit 57 controls the first special character 414 and causes the first special character 414 to advance toward the nearest enemy base 312 closest to the position where the first special character 414 becomes belonging to the ally team. In this case, the special character control unit 57 may increase the movement speed of the first special character 414 when a character of the ally team (a player character and/or an ally character) exists within a predetermined range (hereafter referred to as an "effect range 430") around the first special character 414. The special character control unit 57 may change the status of the character of the ally team when the character of the ally team exists in the effect range 430. For example, the special character control unit 57 may gradually recover the HP of the character of the ally team within the effect range 430.

When the first special character 414 reaches within a predetermined range from the enemy base 312, the scoring unit 70 automatically scores the points possessed by the first special character 414 into the score of the ally team, supplies the supply value corresponding to the score to the enemy base 312, accumulates the supply values in the enemy base 312, and erases the first special character 414. In this case, the base control unit 80 may invalidate generation of an advantageous effect given to the character of the enemy team (enemy player character and/or ally character of enemy player character) by the enemy base 312 for a certain period of time.

Here, the first special character 414 may be defeated by an attack by the enemy player character and/or the ally character of the enemy player character. The special character control unit 57 may cause the first special character 414 not to attack the enemy player character and/or the ally character of the enemy player characters. When the first special character 414 is defeated, the points possessed by the first special character 414 are erased, and the first special character 414 is also erased from the play field 300. Therefore, when the first special character 414 is assigned to the ally team, the player of the ally team has an incentive to operate the player character thereof to protect the first special character 414, and the player of the enemy team has an incentive to operate the player character thereof to attack the first special character 414.

Figure 15:
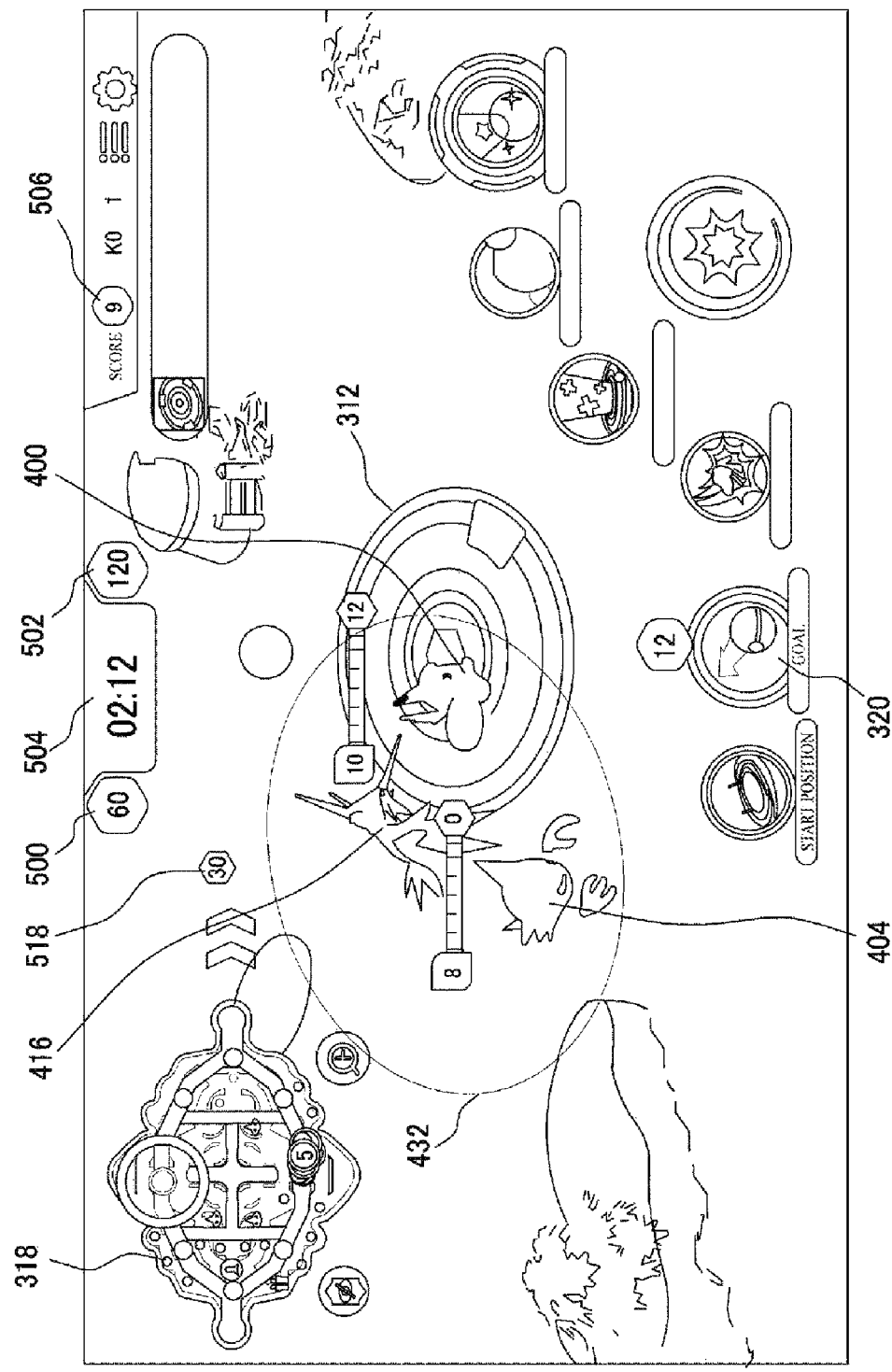
FIG. 15 is a schematic diagram of a second special character in the game system according to the present embodiment.

FIG. 15 shows an outline of an example of the second special character in the game system according to the present embodiment.

First, the appearance control unit 35 causes a second special character 416 to appear at a predetermined position in the play field 300. For example, the appearance control unit 35 causes the second special character 416 to appear in the central part 316 of the play field 300. As a result, the ally player character of the ally team and the enemy player character of the enemy team can have an equal chance of encountering the second special character 416. The second special character 416 possesses a predetermined number of points in advance. In the example of FIG. 15, the second special character 416 possesses "30" points.

When the second special character 416 exists within a predetermined range from the player character existing in the play field 300 in response to an operation of the player, the fight control unit 40 enables the player character to attack the second special character 416. When the fight control unit 40 receives an attack instruction from the player against the second special character 416 via the input unit 20, the fight control unit 40 starts fight between the player character and the second special character 416. The fight control unit 40 causes the display unit 10 to display situations of the status of the player character and the status of the second special character 416 in the same manner as in the fight between the player character 402 and the first special character 414.

When the HP of the second special character 416 becomes zero due to the attack by the player character (for example, the player character 400), the fight result determination unit 45 determines that the player character 400 wins against the second special character 416. Next, the character state determination unit 50 associates the second special character 416 with the team to which the player of the player character 400 belongs (ally team), based on the determination result of the fight result determination unit 45. As a result, the second special character 416 belongs to the ally team. As for the second special character 416, the character that performs the "last hit" may also be determined as the winning character, as in the case of the first special character 414. The character state determination unit 50 assigns the second special character 416 to the team to which the winning character belongs. Then, as shown in FIG. 15, the special character control unit 57 displays points given to the second special character 416 in advance in the vicinity of the second special character 416 (point display 518).

Subsequently, the special character control unit 57 controls the second special character 416 and advances the second special character 416 toward the enemy base 312 closest to a position where the second special character 416 becomes belonging to the ally team. In this case, the special character control unit 57 may increase the movement speed of the second special character 416 when a character of the ally team (a player character and/or an ally character) exists within a predetermined range (hereafter referred to as an "effect range 432") around the second special character 416. The special character control unit 57 may change the status of the character of the ally team when the character of the ally team exists in the effect range 432. For example, the special character control unit 57 may gradually recover the HP of the character of the ally team within the effect range 432. In the example of FIG. 15, the player character 400 and a player character 404 belonging to the ally team exist within the effect range 432, and an advantageous effect is generated for these player characters. A character of a type different from the second special character 416 can be a third special character, a fourth special character, or the like. In this case, the special character control unit 57 may generate a different advantageous effect on the character of the ally team existing in the effect range 432 depending on the type of the special character.

When the second special character 416 reaches a predetermined range from the enemy base 312, according to the lapse of time, the scoring unit 70 automatically scores the points possessed by the second special character 416 into the score of the ally team, supplies the supply value corresponding to the score to the enemy base 312, and accumulates the supply values in the enemy base 312. That is, the scoring unit 70 scores a predetermined amount of the points possessed by the second special character 416 for each predetermined time lapse, and uses the score as the supply value to be supplied to the enemy base 312 (for example, 1 points per second is scored and used as the supply value). When the special character control unit 57 scores all the points possessed by the second special character 416, the special character control unit 57 erases the second special character 416 from the play field 300.

Here, a case where the supply value corresponding to the points possessed by the second special character 416 is accumulated in the enemy base 312 and a total value of the accumulated supply value becomes equal to or higher than the durability value of the enemy base 312, and the points possessed by the second special character 416 remain will be described. In this case, the base control unit 80 first stops the function of this enemy base 312. Then, the special character control unit 57 causes the second special character 416 to advance toward another enemy base 312 closest to the enemy base 312 whose function is stopped, and controls the second special character 416 in the same manner as described above. That is, when the points possessed by the second special character 416 are given to the enemy base 312 as a supply value, the total value of the supply value reaches the durability value, and the enemy base 312 is destroyed, the special character control unit 57 causes the second special character 416 to advance toward the next enemy base 312 when remaining points possessed by the second special character 416 exist. The special character control unit 57 executes the same process until the points possessed by the second special character 416 become zero.

Here, the second special character 416 may be defeated by an attack by the enemy player character and/or the ally character of the enemy player character. The special character control unit 57 may cause the second special character 416 to move and attack on the enemy player character and/or the ally character of the enemy player character. Then, when the second special character 416 is defeated, the points possessed by the second special character 416 are erased, and the second special character 416 is also erased from the play field 300. Therefore, when the second special character 416 is assigned to the ally team, the player of the ally team has an incentive to operate the player character thereof to protect the second special character 416, and the player of the enemy team has an incentive to operate the player character thereof to attack on the second special character 416.

Figure 16:
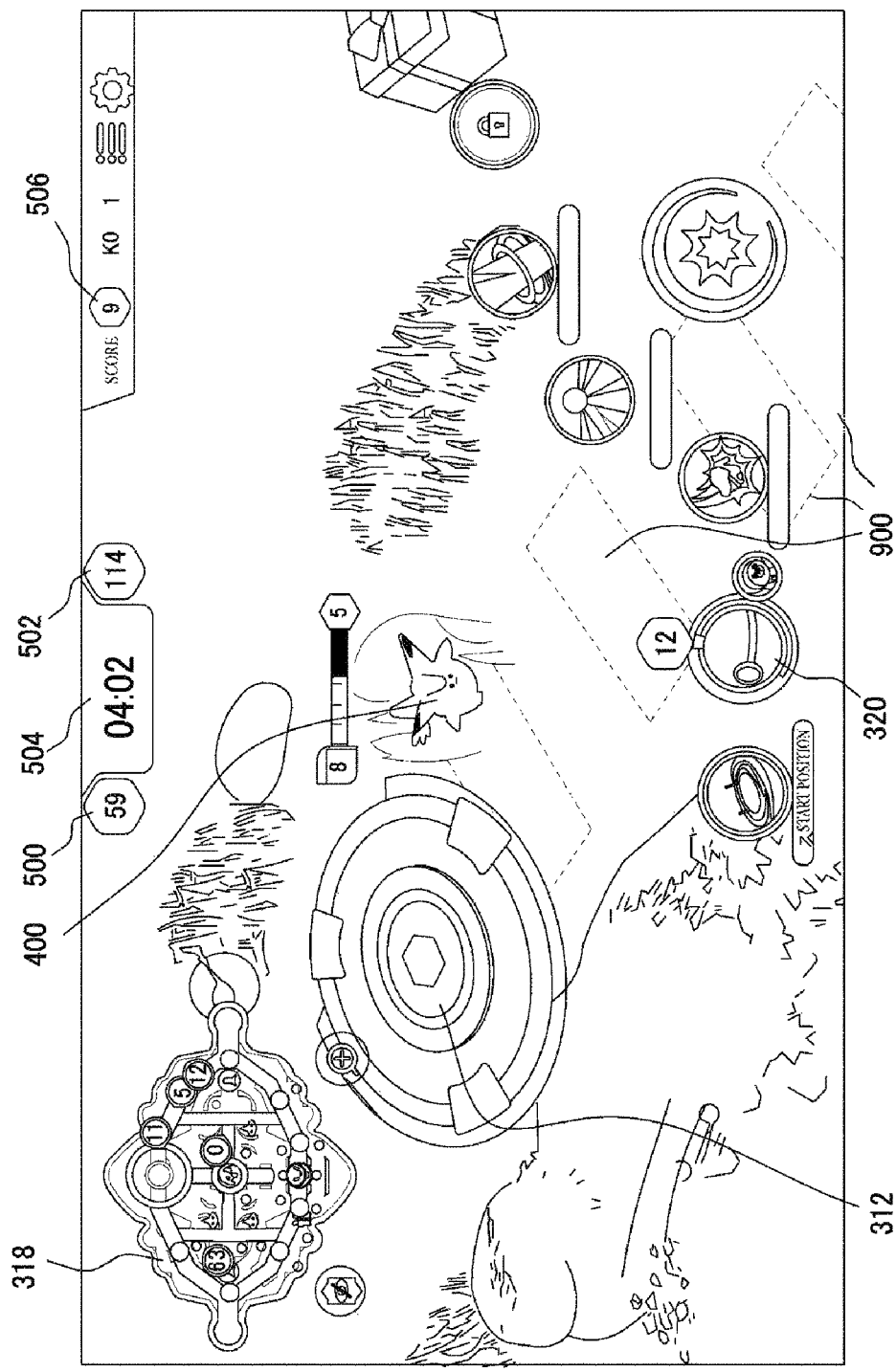
FIG. 16 is a schematic diagram of a restriction generation unit in the game system according to the present embodiment.

FIG. 16 shows an outline of the function of the restriction generation unit in the game system according to the present embodiment. The example of FIG. 16 shows how the player character 400 of the ally team goes beyond the enemy base 312 whose function is not stopped and advances toward the enemy base 312 next to the enemy base 312 provided along the lane 306.

The restriction generation unit 87 slows down the movement speed of the player character 400 when the player character 400 invades between one enemy base 312 and another enemy base 312 next to the one enemy base 312. The restriction generation unit 87 causes the display unit 10 to display a restriction area 900, which is an area in which the movement speed of the player character of the ally team is limited. The restriction area 900 is an area where movement is limited in the lane 306 between the one enemy base 312 and the other enemy base 312 next to the one enemy base 312, and is displayed so as to be perceptible by the player. The restriction area 900 is a pattern superimposed and displayed on the lane 306 as an example. The restriction generation unit 87 may add a predetermined color to the pattern, make the pattern blinking, or the like. The restriction generation unit 87 may display a predetermined pattern around the player character 400 existing in the restriction area 900. In the example of FIG. 16, a plurality of areas are indicated by dotted lines, but a combination of the plurality of areas shown by the dotted lines and areas between the areas is the restriction area 900 (that is, the entire lane 306 between the one enemy base 312 and the other adjacent enemy base 312 is the restriction area 900).

When the restriction generation unit 87 applies the movement speed restriction between the one enemy base 312 and the other enemy base 312 located next to the one enemy base 312, when the function of the one enemy base 312 is stopped by the base control unit 80, the movement speed restriction is released and the display of the restriction area 900 is erased. Accordingly, the player character of the ally team can move at a normal speed.

The appearance control unit 35 may change the appearance timing and/or the appearance place of a predetermined neutral character in the play field 300 according to fight situation between the ally team and the enemy team. For example, examples of the predetermined neutral character include a neutral character, when being defeated, having an effect of reducing a score of the opponent team that is hostile to the team to which the player character who defeated the predetermined neutral character belongs. The predetermined neutral character may possess a predetermined number of points like other neutral characters, and the predetermined number of points may be given to the player character who defeated the predetermined neutral character.

Specifically, the appearance control unit 35 changes the appearance place of the predetermined neutral character according to a difference between the score of the ally team and the score of the enemy team (hereinafter referred to as a "score difference"). For example, if the score difference is positive (that is, the score of the ally team is more than that of the enemy team), the appearance control unit 35 shifts the appearance place of the predetermined neutral character toward the ally headquarter 302 by a predetermined distance, and if the score difference is negative, the appearance control unit 35 can shift the appearance place of the predetermined neutral character toward the enemy headquarter 304 by a predetermined distance.

First, if no score difference exists between the score of the ally team and the score of the enemy team, the appearance control unit 35 causes the predetermined neutral character to appear at an intermediate point between the ally headquarter 302 and the enemy headquarter 304. However, when the score difference is equal to or less than a predetermined value (for example, when the score of the ally team is "10" and the score of the enemy team is "1"), the appearance control unit 35 shifts the appearance place of the predetermined neutral character toward the ally headquarter 302 by a distance according to the score difference (for example, the appearance place is shifted to the ally headquarter 302 side by a distance of 10% of the straight line distance from the ally headquarter 302 to the enemy headquarter 304). When the score difference exceeds a predetermined value (for example, when the score of the ally team is "90" and the score of the enemy team is "10"), the appearance control unit 35 shifts the appearance place of the predetermined neutral character toward the ally headquarter 302 by a distance according to the score difference (for example, the appearance place is shifted to the ally headquarter 302 side by a distance of 90% of the straight line distance from the ally headquarter 302 to the enemy headquarter 304). That is, the appearance control unit 35 can increase the distance by which the appearance place is shifted as the score difference increases. As a result, the player characters belonging to the team with the smaller number of score earned can increase chance of defeating the predetermined neutral character on the side close to the base of the opponent team and chance of quickly scoring the points (that is, a time for the player character possessing the points to reach the base of the opponent team and score the points can be shortened).

In the game system 1 according to the present embodiment, when the player character defeats the neutral character, the player character earns the points possessed by the neutral character. However, in this modified example, the neutral character may have a predetermined item. In this case, when the player character defeats the neutral character, the player character acquires the predetermined item. Then, the player character may provide the predetermined item to the base of the opponent to give a score to the team to which the player character belongs based on the provided item.

FIGS. 17 to 20 show an example of a processing flow in the game system according to the present embodiment.

First, at the start of the game of the game system 1, one or more players belonging to one team (ally team) select player characters (ally player characters), and one or more other players belonging to the other team (enemy team) also select player characters (enemy player characters). In the following, the description takes one player of the ally team as a subject.

Figure 17:
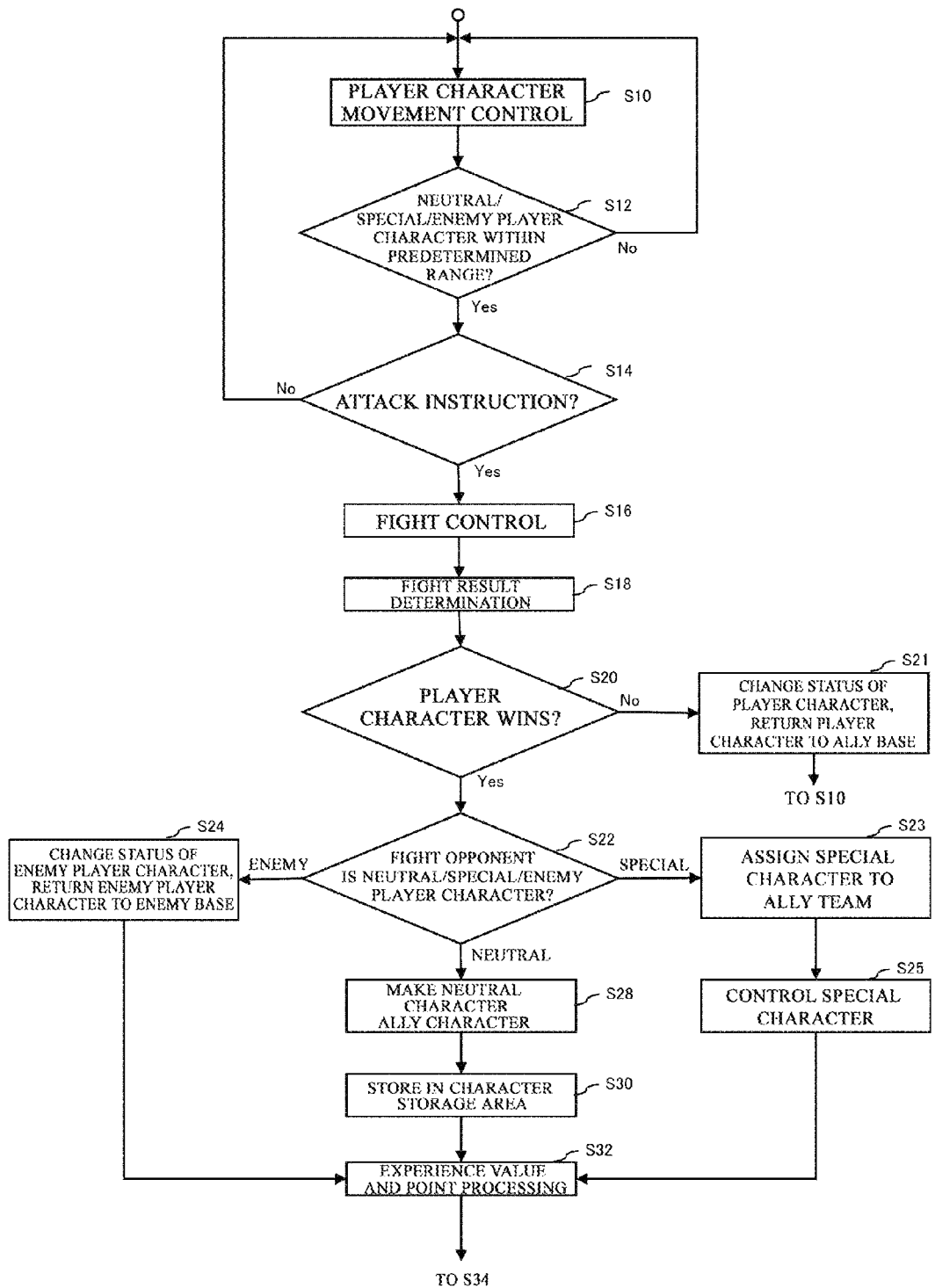
FIG. 17 is a flow chart of processing in the game system according to the present embodiment.

As shown in FIG. 17, after the game starts, the character action control unit 30 controls the movement of the player character of the player in the play field 300 in response to an instruction of the player received via the input unit 20 (step 10; hereinafter, a step is referred to as "S"). As a result, the player character moves in the lanes 306, the neutral region 314, the central part 316, and the like of the play field 300. Then, when a neutral character, a special character, or an enemy player character (hereinafter referred to as a "target character") exists in a virtual circular area (hereinafter referred to as "attackable range") having a predetermined radius around the player character (Yes in S12), the character action control unit 30 executes movement control of the player character, and the fight control unit 40 determines whether or not an attack instruction from the player is received via the input unit 20 (S14). On the other hand, when no target characters exist within the attackable range (No of S12), the character action control unit 30 continues controlling the movement of the player character (S10). If the fight control unit 40 does not receive the attack instruction from the player via the input unit 20 (No in S14), the character action control unit 30 also continues controlling the movement of the player character (S10).

When the fight control unit 40 receives the attack instruction from the player via the input unit 20 (Yes in S14), the fight control unit 40 controls the fight between the player character and the target character within the attackable range (S16). The fight control unit 40 supplies information indicating changes in status of both characters caused by the fight between the player character and the target character to the fight result determination unit 45. The fight result determination unit 45 determines which of the two characters wins based on the information received from the fight control unit 40 (S18). When the fight result determination unit 45 determines that the player character wins against the target character (Yes in S20), a process is executed according to the type of the target character (S22).

First, when the target character is a neutral character ("neutral" in S22), the character state determination unit 50 makes the neutral character an ally character of the player character by associating the neutral character with the player (S28). That is, the character state determination unit 50 associates the character ID of the neutral character with the player ID. Then, the character state determination unit 50 erases display of the neutral character from the play field 300, and stores the neutral character as an ally character in the character storage area (S30). In this case, an image of the stored ally character (that is, an icon) is displayed in contact with or in the vicinity of the character storage area. The experience value giving unit 60 gives a predetermined experience value to the player character based on defeating the neutral character, and the point giving control unit 62 gives the player character points previously associated with the neutral character (S32).

When the target character is an enemy player character ("enemy" in S22), the character state determination unit 50 changes the status of the enemy player character (for example, the HP, which became zero when losing to the player character, is fully recovered costing a predetermined period of time) and returns the enemy player character to the enemy headquarter 304 (S24). The character state determination unit 50 prohibits operations on the enemy player character from a time when the enemy player character loses until the enemy player character is returned to the enemy headquarter 304. Then, the experience value giving unit 60 gives the player character a predetermined experience value based on defeating the enemy player character, and the point giving control unit 62 gives a predetermined number of points to the player character based on defeating the enemy player character (S32).

When the target character is a special character ("special" in S22), the character state determination unit 50 assigns the special character to the team to which the player belongs (S23). That is, the character state determination unit 50 associates the character ID of the special character with the team ID of the ally team. Unlike the neutral character, the character state determination unit 50 does not store the special character in the character storage area and keeps the special character appearing in the play field 300. Then, the special character control unit 57 controls the special character and causes the special character to perform a predetermined action according to the type of the special character (S25). The experience value giving unit 60 gives a predetermined experience value to the player character based on defeating the special character. The point giving control unit 62 may not give the predetermined number of points to the player character based on defeating the special player character (S32).

However, when the player character loses fight against the target character (No in S20), the character state determination unit 50 changes the status of the player character and returns the player character to the ally headquarter 302 (for example, the HP, which became zero when losing to the target character, is fully recovered costing a predetermined period of time). The character state determination unit 50 prohibits operations on the player character from a time when the player character loses until the player character is returned to the ally headquarter 302. After the player character returns to the ally headquarter 302, steps from S10 are executed again.

Figure 18:
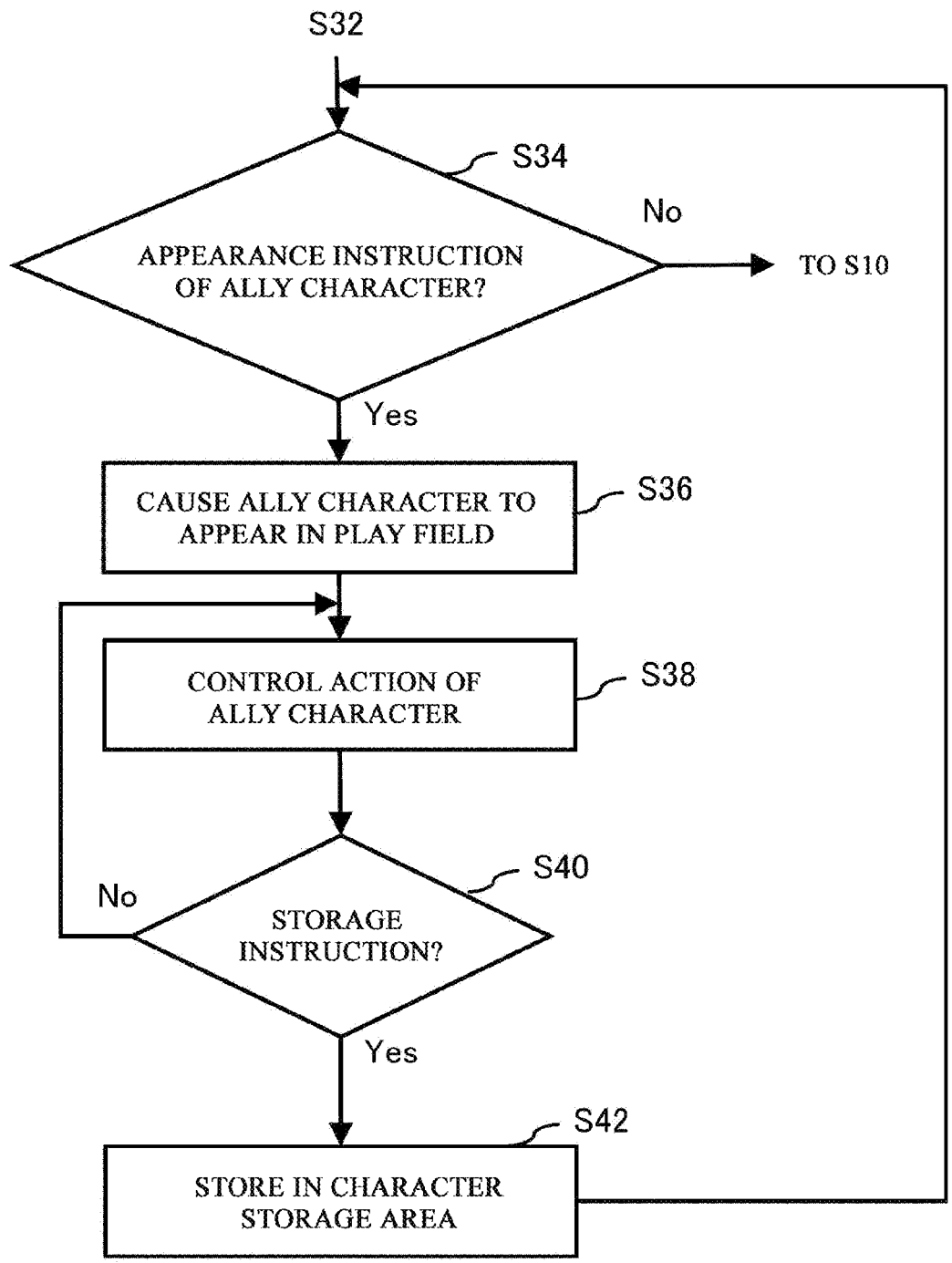
FIG. 18 is a flow chart of processing in the game system according to the present embodiment.

Next, FIG. 18 shows a control flow of the ally character. First, with the ally character stored in the character storage area, the ally character control unit 55 determines whether or not an appearance instruction from the player for the ally character to appear in the play field 300 is received via the input unit 20 (S34). If no appearance instruction is received (No in S34), steps from S10 are executed. However, when an appearance instruction is received (Yes in S34), the ally character control unit 55 causes the ally character to appear in the play field 300 from the character storage area (S36). Here, the character storage area can be displayed having, for example, a ball shape. A closed ball is displayed when the ally character is stored, and an open ball is displayed when the ally character is released out.

The ally character control unit 55 controls action of the ally character appearing in the play field 300 (S38). Specifically, the ally character control unit 55 moves the ally character so as to follow the player character. When an enemy player character, another neutral character, and/or a special character exists within a predetermined range from the player character or the ally character, the ally character control unit 55 causes the ally character to automatically perform an attack on the enemy player character, the other neutral character, and/or the special character.

Subsequently, the ally character control unit 55 stores the ally character appearing in the play field 300 in the character storage area, and erases the display of the ally character from the play field 300 (S42) when a storage instruction from the player to the character storage area of the ally character is received via the input unit 20 (Yes in S40). Then, S34 and steps thereafter are executed. On the other hand, when the ally character control unit 55 does not receive the storage instruction from the player to the character storage area of the ally character via the input unit 20 (No in S40), S38 and steps thereafter are executed.

Figure 19:
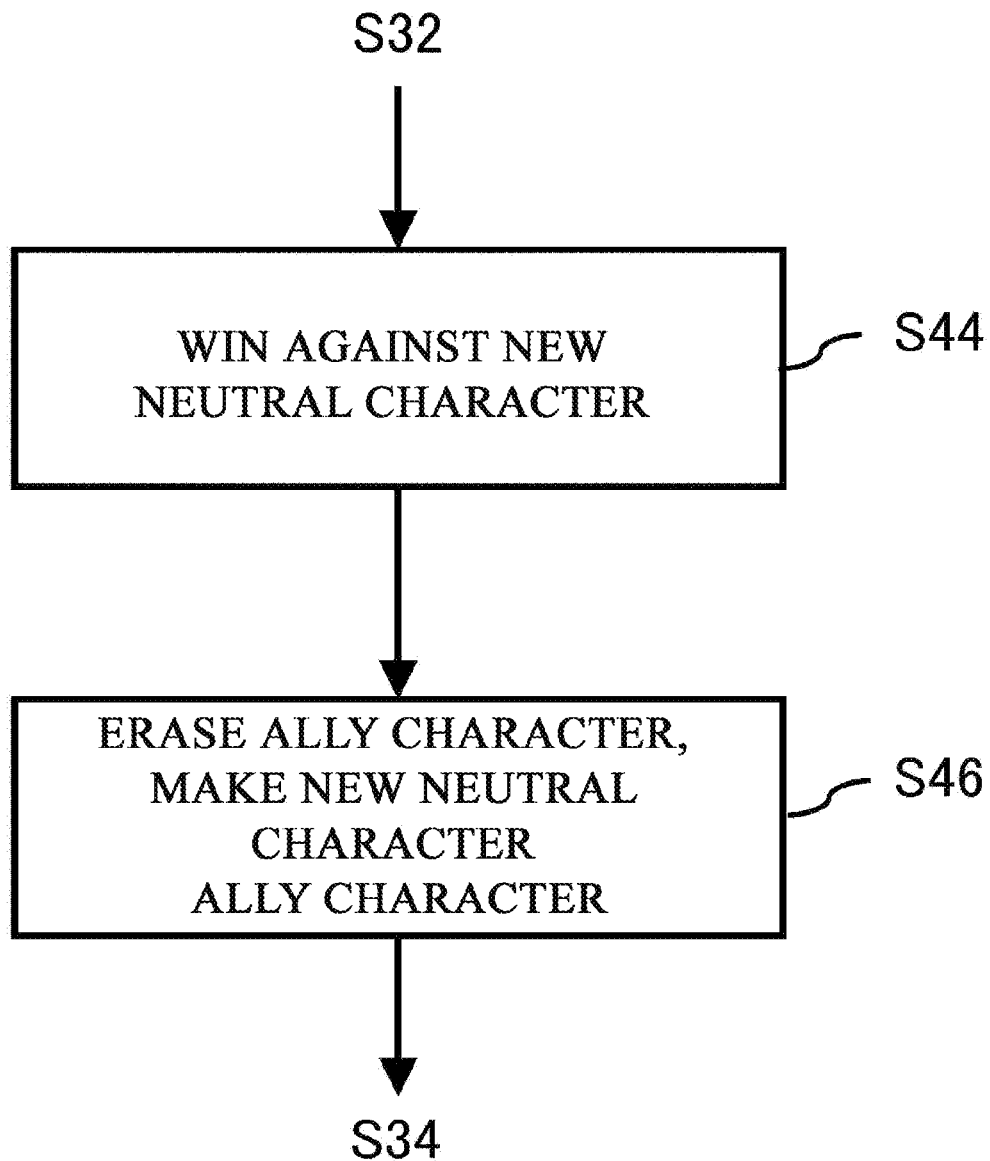
FIG. 19 is a flow chart of processing in the game system according to the present embodiment.

FIG. 19 shows a control flow when the player character fight a new neutral character. When the player character possesses an ally character and the player character wins against a new neutral character (S44), the character state determination unit 50 makes the new neutral character a new ally character (S46). Then, the character state determination unit 50 erases the ally character stored in the character storage area or the ally character appearing in the play field 300, and stores the new neutral character as an ally character in the character storage area. Then, S34 and steps thereafter are executed.

Figure 20:
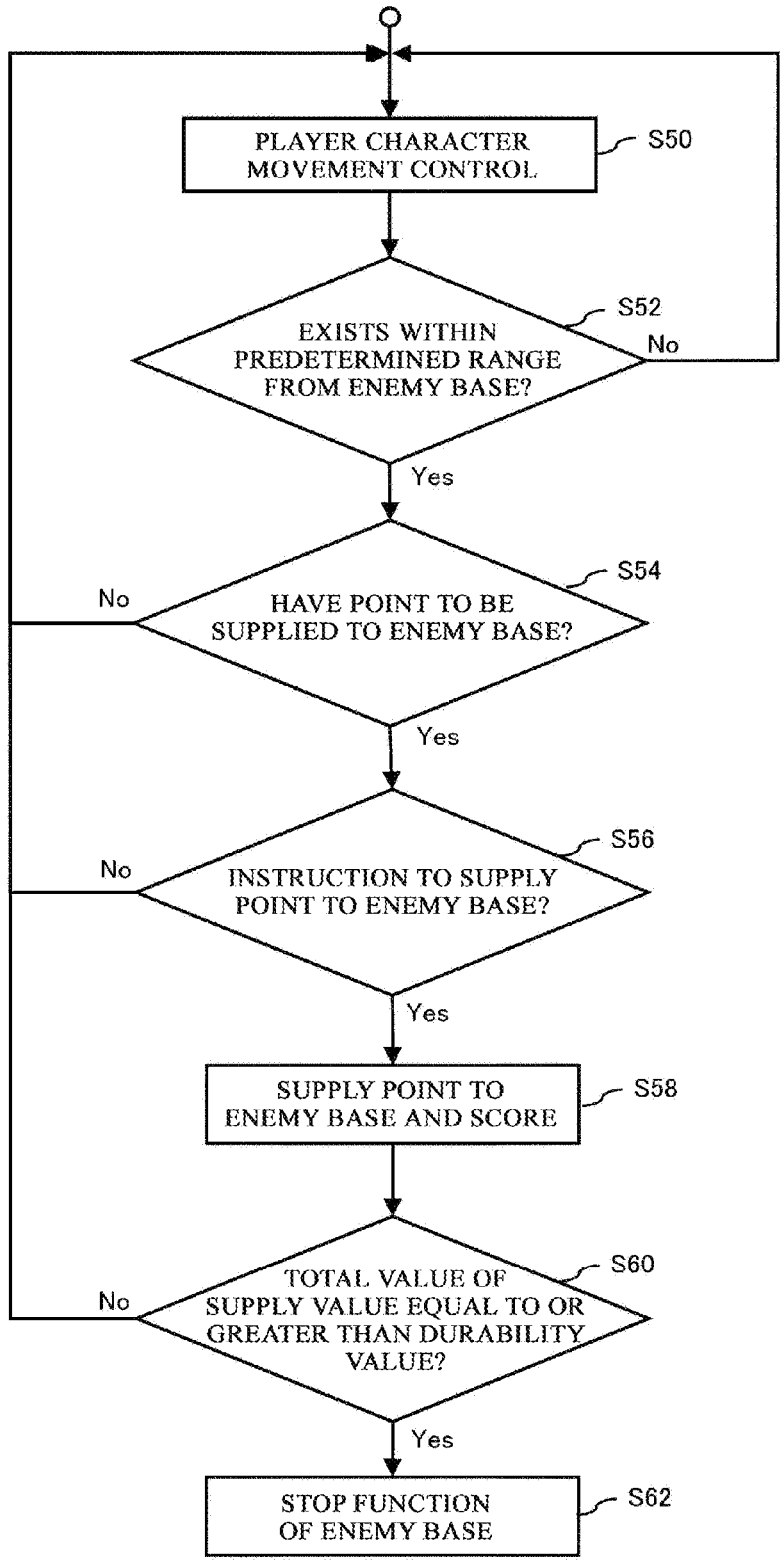
FIG. 20 is a flow chart of processing in the game system according to the present embodiment.

Next, FIG. 20 shows a control flow of a scoring process of points. First, the character action control unit 30 controls the movement of the player character (belonging to the ally team) in the play field 300 in response to an instruction of the player received via the input unit 20 (S50). Then, the scoring unit 70 determines whether or not the player character exists within a predetermined range from an enemy base 312 (S52). When the player character does not exist within the predetermined range from an enemy base 312 (No in S52), S50 and steps thereafter are executed.

However, when the player character exists within the predetermined range from an enemy base 312 (Yes in S52), the scoring unit 70 determines whether or not the player character possesses points (S54). When the player character does not possess points (No in S54), S50 and steps thereafter are executed. When the player character possesses points (Yes in S54), the scoring unit 70 determines whether or not a point supply instruction is received from the player to supply the points to the enemy base 312 via the input unit 20 (S56). When no point supply instruction is received from the player (No in S56), S50 and steps thereafter are executed.

On the other hand, when a point supply instruction is received from the player (Yes in S56), the scoring unit 70 supplies the points possessed by the player character to the enemy base 312, and converts the points into a score of the ally team. The scoring unit 70 can directly use a numerical value of the points as the score, or can use a value obtained by multiplying the points by a predetermined coefficient determined according to the remaining time of the game as the score. The scoring unit 70 supplies a supply value according to the score or the points to the enemy base 312 and accumulates the supply values in the enemy base 312 (S58). For example, the scoring unit 70 can directly use a numerical value of the points as the supply value, or can use a value obtained by multiplying the points by a predetermined coefficient determined according to the remaining time of the game as the supply value.

Then, the base control unit 80 compares a total value of the supply values accumulated in the enemy base 312 by the scoring unit 70 with the durability value preset in the enemy base 312 (S60). The total value of the supply values is a total value of the supply value according to the points supplied to the enemy base 312 by one player character and the supply value according to the points supplied to this enemy base 312 by other player characters of the same team as the one player character. When the base control unit 80 determines that the total value of the supply values is less than the durability value (No in S60), S50 and steps thereafter are executed. However, when the base control unit 80 determines that the total value of the supply values is equal to or greater than the durability value (Yes in S60), the base control unit 80 stops the function of the enemy base 312

(S62). The outcome determination unit 85 ends the game when a predetermined game time has elapsed, and determines the outcome of the game based on the score of each team at the end.

Each component included in the game system 1 according to the present embodiment shown in FIGS. 1 to 20 can be implemented by causing an arithmetic processing unit such as a central processing unit (CPU) to execute a program (that is, a game program), that is, by processing by software. Each component can also be implemented by writing a program in advance to hardware as an electronic component such as an integrated circuit (IC). The software and the hardware can also be used together.

The game program according to this embodiment can be incorporated in advance into, for example, IC or ROM. The game program is a file in installable format or executable format, can be recorded in a non-transitory computer-readable recording medium such as magnetic recording medium, optical recording medium, or semiconductor recording medium, and can also be provided as computer program. The recording medium in which the program is stored may be non-transient recording medium such as CD-ROM or DVD. Further, the game program can be stored in advance in a computer connected to a communication network such as the Internet so that the game program can be provided by download via the communication network.

The game program according to the present embodiment works on the CPU and the like, and is made to function as the display unit 10, display control unit 15, input unit 20, storage unit 25, character action control unit 30, appearance control unit 35, fight control unit 40, fight result determination unit 45, character state determination unit 50, ally character control unit 55, special character control unit 57, experience value giving unit 60, point giving control unit 62, evolution control unit 64, scoring unit 70, base control unit 80, outcome determination unit 85, restriction generation unit 87, time limit control unit 90, character information storage unit 250, team information storage unit 252, player information storage unit 254, and play field information storage unit 256 described with reference to FIGS. 1 to 20.

In the game system 1 according to the present embodiment, the player can acquire points by operating the player character and defeating the neutral character automatically controlled by the system, and can convert the acquired points into the score of his/her team at the base of the opponent team. As a result, in the game system 1, the player can enjoy the game even without performing an interpersonal battle with an opponent player character operated by another player, and can contribute to the team to which the player belongs even without performing an interpersonal battle. That is, in the game system 1, the player can contribute to the team to which the player belongs by an action other than the interpersonal battle (action to defeat the neutral character and the like) in the game, and can improve the skill level of operations required for the interpersonal battle by the action. Therefore, the player can reduce the feeling of being not good at the interpersonal battle by experiencing the battle with the neutral character.

In the game system 1, the player can associate the neutral character defeated by the player character with the player and make the neutral character an ally character, cause the ally character to appear in the play field 300, and cause the ally character to follow movement of the player character and automatically attack another neutral character or an enemy player character. As a result, in the game system 1, the player not only can fight the neutral character and defeat the neutral character, but also can make the neutral character an ally character and cause the neutral character to fight together with the player character.

In the game system 1, the player can freely select to store the ally character in the character storage area and to cause the ally character to appear in the play field 300 from the character storage area. That is, in the game system 1, as long as before scoring the points possessed by the player character, the possessed ally character can be caused to appear in the play field 300 and used as a force to fight together with the player character. As a result, in the game system 1, for example, when the HP of the ally character is high, the ally character can be caused to appear in the play field 300 and fight together, and when the HP becomes low, the ally character can be stored in the character storage area and used for scoring.

Although the embodiment of the present disclosure has been described above, the embodiment described above does not restrict the invention according to the scope of claims. It should be noted that not all combinations of features described in the embodiment are essential to means for solving the problems of the invention. Further, technical elements of the embodiment described above may be applied alone, or may be divided into a plurality of parts such as a program component and a hardware component so as to be applied.

REFERENCE SIGNS LIST 1 game system
3, 3a, 3n information terminal
5 communication network
7 server
10 display unit
15 display control unit
20 input unit
25 storage unit
30 character action control unit
35 appearance control unit
40 fight control unit
45 fight result determination unit
50 character state determination unit
55 ally character control unit
57 special character control unit
60 experience value giving unit
62 point giving control unit
64 evolution control unit
70 scoring unit
80 base control unit
85 outcome determination unit
87 restriction generation unit
90 time limit control unit
200 input surface
210 input control unit
212 movement instruction input area
214 direction display area
216 direction instruction unit
250 character information storage section
252 team information storage section
254 player information storage section
256 play field information storage section
300 play field
302 ally headquarter
304 enemy headquarter
306 lane
310 ally base
312 enemy base
314 neutral region 316 central part
318 overall view
320 character storage area
322 stored character presentation
324 countdown display
400, 402, 404 player character
410 neutral character
412 ally character
414 first special character
411, 415 status
416 second special character
420 enemy player character
430, 432 effect range
500 ally team score
502 enemy team score
504 remaining game time
506 player score
510, 511 status
512, 514, 516, 518 point display
600 attack instruction area
602 skill generation area
700 return instruction area
800 performance display
802 display
900 restriction area

What is claimed is:

1. A game system comprising a server, a plurality of terminals and a communication network connecting the server and the plurality of terminal for bidirectional communication, wherein an ally team to which a player at a respective one of the plurality of terminals belongs and an enemy team to which a player at a respective one of the plurality of terminals belongs compete in a play field of a multiplayer online game hosted by the server, the server further comprising a processor and a storage device storing a plurality of programs executable by the processor, and the plurality of programs further comprising:
 a character action control unit configured to control actions of a player character in the play field based on instructions of the player from a corresponding terminal;
 a point giving control unit configured to add a predetermined number of points associated with a neutral character not belonging to either the ally team or the enemy team to a point value associated with the player character in response to the neutral character reaching a predetermined state relative to the player character;
 a scoring unit configured to convert the point value associated with the player character to a score of the ally team when the player character is located in a predetermined area provided in the play field and completes a score transferring operation; and
 an outcome determination unit configured to determine an outcome of the game by comparing scores associated with the ally team and the enemy team and cause the outcome of the game to be delivered to the corresponding terminal via the communication network and displayed to the player by a display unit at the corresponding terminal.

2. The game system according to claim 1, wherein the predetermined state is that the neutral character is defeated by the player character.

3. The game system according to claim 1, wherein the predetermined state is that the player character maintains a corresponding relationship with the neutral character when the neutral character is defeated.

4. The game system according to claim 1, wherein the predetermined area corresponds to the enemy team, and the scoring unit is further configured to deduct the point value associated with the player character from a durability value associated with the predetermined area, and change a state of the predetermined area from active to inactive in response to the durability value reaching a threshold.

5. The game system according to claim 1, wherein the scoring unit is further configured to determine incompleteness of the score conversion operation in response to the operation being interrupted by another character.

6. The game system according to claim 1, wherein the plurality of programs further comprise a point removing unit configured to remove at least a portion of the point value from the player character in response to the player character being killed.

7. The game system according to claim 1, wherein the neutral character is a special character, and the plurality of programs further comprise a conversion unit configured to convert the special character to a state facilitating the ally team to obtain scores after the neutral character is defeated by the player character.

8. The game system according to claim 7, wherein the state facilitating the ally team to obtain scores comprises the special character fighting with characters belonging to the enemy team.

9. The game system according to claim 7, wherein the state facilitating the ally team to obtaining scores comprises the special character providing buff to characters belonging to the ally team.

10. The game system according to claim 7, wherein the state facilitating the ally team to obtaining scores comprises the special character adding points to the score of the ally team.

11. The game system according to claim 10, wherein the adding the portion of points to score associated with the ally team further comprises:
 moving the special character toward the predetermined area; and
 adding the points to score associated with the ally team in response to the special character reaching the predetermined area.

12. The game system according to claim 7, wherein the state facilitating the ally team to obtaining scores comprises the special character expediting the score conversion operation for characters belonging to the ally team.

13. The game system according to claim 4, wherein:
 at least two of the predetermined areas corresponding to the enemy team are provided at intervals in the play field; and
 the plurality of programs further comprise an impediment generation unit configured to impede the player character from moving between the at least two of the predetermined areas being active.

14. The game system according to claim 13, wherein the impediment generation unit is further configured to slow the player character's movement between the at least two of the predetermined areas.

15. The game system according to claim 7, wherein the special character among the neutral characters appears at a predetermined position in the play field.

16. The game system according to claim 1, wherein
 a time limit in which the game is executable is preset, and
 an extension area configured to extend the time limit is provided in the play field, and
 the plurality of programs further comprise a time limit control unit configured to extend the time limit in response a character belonging to either the ally team or the enemy team exists within a predetermined range from the extension base for at least a predetermined time.

17. A method performed at a game system comprising a server, a plurality of terminals and a communication network connecting the server and the plurality of terminal for bidirectional communication, wherein an ally team to which a player at a respective one of the plurality of terminals belongs and an enemy team to which a player at a respective one of the plurality of terminals belongs compete in a play field of a multiplayer online game hosted by the server, the method comprising:
- controlling actions of a player character in the play field based on instructions of the player from a corresponding terminal;
- adding a predetermined number of points associated with a neutral character not belonging to either the ally team or the enemy team to a point value associated with the player character in response to the neutral character reaching a predetermined state relative to the player character;
- converting the point value associated with the player character to a score of the ally team when the player character is located in a predetermined area provided in the play field and completes a score transferring operation; and
- determining an outcome of the game by comparing scores associated with the ally team and the enemy team and causing the outcome of the game to be delivered to the corresponding terminal via the communication network and displayed to the player by a display unit at the corresponding terminal.

18. The method according to claim 17, further comprising converting the neutral character to a state facilitating the ally team to obtain scores after the neutral character is defeated by the player character.

19. A non-transitory computer-readable storage medium storing computer programs that, when executed by a game system comprising a server, a plurality of terminals and a communication network connecting the server and the plurality of terminal for bidirectional communication, wherein an ally team to which a player at a respective one of the plurality of terminals belongs and an enemy team to which a player at a respective one of the plurality of terminals belongs compete in a play field of a multiplayer online game hosted by the server, causes the game system to perform a plurality of operations including:
- controlling actions of a player character in the play field based on instructions of the player from a corresponding terminal;
- adding a predetermined number of points associated with a neutral character not belonging to either the ally team or the enemy team to a point value associated with the player character in response to the neutral character reaching a predetermined state relative to the player character;
- converting the point value associated with the player character to a score of the ally team when the player character is located in a predetermined area provided in the play field and completes a score transferring operation; and
- determining an outcome of the game by comparing scores associated with the ally team and the enemy team and causing the outcome of the game to be delivered to the corresponding terminal via the communication network and displayed to the player by a display unit at the corresponding terminal.

20. The non-transitory computer-readable storage medium according to claim 19, wherein the plurality of operations further comprise converting the neutral character to a state facilitating the ally team to obtain scores after the neutral character is defeated by the player character.

* * * * *